(12) United States Patent
Deval et al.

(10) Patent No.: US 9,503,347 B2
(45) Date of Patent: Nov. 22, 2016

(54) TECHNIQUES ASSOCIATED WITH SERVER TRANSACTION LATENCY INFORMATION

(71) Applicant: INTEL CORPORATION, Santa Clara, CA (US)

(72) Inventors: Manasi Deval, Portland, OR (US); Jim Daubert, Seattle, WA (US); Eric Mann, Hillsboro, OR (US); Cong Li, Shanghai (CN); Muralidhar Murali Rajappa, Chandler, AZ (US); Anjaneya Reddy Chagam Reddy, Chandler, AZ (US); David Wescott, Roseville, CA (US); Ramkumar Nagappan, Chandler, AZ (US); Raed Kanjo, Dupont, WA (US)

(73) Assignee: INTEL CORPORATION, Santa Clara, CA (US)

( * ) Notice: Subject to any disclaimer, the term of this patent is extended or adjusted under 35 U.S.C. 154(b) by 272 days.

(21) Appl. No.: 13/976,964

(22) PCT Filed: Dec. 18, 2012

(86) PCT No.: PCT/CN2012/086851
§ 371 (c)(1),
(2) Date: Jun. 27, 2013

(87) PCT Pub. No.: WO2014/094237
PCT Pub. Date: Jun. 26, 2014

(65) Prior Publication Data
US 2015/0222516 A1    Aug. 6, 2015

(51) Int. Cl.
*G06F 11/00* (2006.01)
*H04J 1/16* (2006.01)
(Continued)

(52) U.S. Cl.
CPC ......... *H04L 43/0894* (2013.01); *H04L 1/1678* (2013.01); *H04L 41/5032* (2013.01);
(Continued)

(58) Field of Classification Search
CPC .... H04L 49/354; H04L 69/161; H04L 69/28
USPC ........... 370/503, 422, 241, 241.1, 252, 253, 370/254
See application file for complete search history.

(56) References Cited

U.S. PATENT DOCUMENTS 8,451,867 B2    5/2013  Dowd
8,705,552 B1 *  4/2014  Lin ........................ H04L 47/00
                                                     370/235

(Continued)

FOREIGN PATENT DOCUMENTS

CN    101309125    11/2008
CN    102739659    10/2012

OTHER PUBLICATIONS

Manoj Nambiar, Hemanta Kumar Kalita, "Performance Monitoring and Analysis of a Large Online Transaction Processing System", Proceedings of the SPEC international workshop on Performance Evaluation: Metrics, Models and Benchmarks (SIPEW-2008) (2008), pp. 303-313.

(Continued)

*Primary Examiner* — Chuong T Ho

(57) ABSTRACT

Examples are disclosed for determining or using server transaction latency information. In some examples, a network input/output device coupled to a server may be capable of time stamping information related to ingress request and egress response packets for a transaction. For these examples, elements of the server may be capable of determining transaction latency values based on the time stamped information. The determined transaction latency values may be used to monitor or manage operating characteristics of the server to include an amount of power provided to the server or an ability of the server to support one or more virtual servers. Other examples are described and claimed.

16 Claims, 21 Drawing Sheets

(51) Int. Cl.
*H04L 1/00* (2006.01)
*H04L 12/26* (2006.01)
*H04L 29/08* (2006.01)
*H04L 1/16* (2006.01)
*H04L 12/24* (2006.01)
*H04L 12/851* (2013.01)
*H04L 12/931* (2013.01)
*H04L 29/06* (2006.01)

(52) U.S. Cl.
CPC ......... *H04L47/2425* (2013.01); *H04L 49/354* (2013.01); *H04L 67/1029* (2013.01); *H04L 69/161* (2013.01); *H04L 69/28* (2013.01)

(56) References Cited

U.S. PATENT DOCUMENTS

| | | | |
|---|---|---|---|
| 8,879,586 B2* | 11/2014 | Tzeng | 370/503 |
| 2002/0055999 A1* | 5/2002 | Takeda | H04L 41/5009 709/224 |
| 2007/0260676 A1 | 11/2007 | Bozinovski et al. | |
| 2008/0008178 A1* | 1/2008 | Tychon et al. | 370/392 |
| 2011/0051754 A1* | 3/2011 | Lansdowne | H04J 3/0697 370/503 |
| 2011/0264790 A1 | 10/2011 | Haeuptle et al. | |
| 2011/0305149 A1* | 12/2011 | Scott | H04L 12/2697 370/252 |
| 2012/0128011 A1* | 5/2012 | Holmeide | H04L 69/28 370/474 |
| 2012/0327949 A1* | 12/2012 | Korger et al. | 370/412 |
| 2013/0010600 A1* | 1/2013 | Jocha | H04L 43/026 370/236.2 |
| 2013/0343378 A1* | 12/2013 | Veteikis | H04L 49/555 370/389 |
| 2013/0343379 A1* | 12/2013 | Stroud | H04L 43/50 370/389 |
| 2013/0343387 A1* | 12/2013 | Stroud | H04L 45/74 370/392 |
| 2013/0343390 A1* | 12/2013 | Moriarty | H04L 43/0852 370/392 |
| 2013/0346628 A1* | 12/2013 | Canion | H04L 63/0876 709/245 |
| 2013/0347103 A1* | 12/2013 | Veteikis | H04L 1/24 726/22 |
| 2014/0177653 A1* | 6/2014 | Tzeng | H04J 3/0635 370/503 |
| 2015/0098339 A1* | 4/2015 | Jocha | H04L 43/026 370/241.1 |

OTHER PUBLICATIONS

International Search Report and Written Opinion received for PCT Patent Application No. PCT/CN2012/086851, mailed Sep. 26, 2013, 12 pages.
Search Report and Office Action received for Chinese Patent Application No. 201280065209.5, mailed Apr. 20, 2016, 5 pages (untranslated).

* cited by examiner

Pending Transaction Table 310

| Time (ms) | SrcIP | SrcPort | DestIP | DestPort |
|---|---|---|---|---|
| 1.3677 | 10.2.13.100 | 3371 | 143.182.253.178 | 80 |
| 5.3789 | 10.2.13.100 | 3372 | 143.182.253.178 | 80 |
| 7.4678 | 10.2.13.101 | 3371 | 143.182.253.178 | 80 |
| 10.7394 | 10.2.13.101 | 3372 | 143.182.253.177 | 80 |
| 18.2356 | 143.182.253.178 | 80 | 10.2.13.100 | 3371 |
| ... | ... | ... | ... | ... |

Match

Completed Transaction Table 320

| Latency Time (ms) | DestIP | DestPort |
|---|---|---|
| 16.8679 | 143.182.253.178 | 80 |
| 5.7891 | 143.182.253.178 | 80 |
| 25.1245 | 143.182.253.178 | 80 |
| 10.2548 | 143.182.253.178 | 80 |
| 9.5478 | 143.182.253.178 | 80 |
| 35.2458 | 143.182.253.178 | 80 |
| 7.4587 | 143.182.253.178 | 80 |
| 45.1258 | 143.182.253.178 | 80 |
| 27.1254 | 143.182.253.178 | 80 |
| 18.4587 | 143.182.253.178 | 80 |
| ... | ... | ... |

PLACE SEPARATE TIME STAMPS ON INGRESS REQUEST PACKETS DESTINED FOR A SERVER COUPLED TO THE NETWORK I/O DEVICE AND PLACE SEPARATE TIME STAMPS ON EGRESS RESPONSE PACKETS SOURCED FROM THE SERVER
1202

CAPTURE PORTIONS OF SEPARATE INGRESS REQUEST PACKETS AND PORTIONS OF SEPARATE EGRESS RESPONSE PACKETS, THE CAPTURED PORTIONS TO UNIQUELY IDENTIFY THE SEPARATELY TIME STAMPED INGRESS REQUEST PACKETS AND THE SEPARATELY TIME STAMPED EGRESS RESPONSE PACKETS
1204

FORWARD THE CAPTURED PORTIONS WITH RESPECTIVE TIME STAMPS TO CIRCUITRY MAINTAINED AT THE SERVER
1206

*FIG. 12*

Storage Medium 1300

*Computer Executable Instructions for 1200*

```
RECEIVE TIME STAMPED PORTIONS OF INGRESS REQUEST
PACKETS FROM A NETWORK I/O DEVICE COUPLED TO THE
SERVER AND PLACE THE RECEIVED TIME STAMPED
PORTIONS OF THE INGRESS REQUEST PACKETS IN A
TRANSACTION TABLE
1502
```

```
RECEIVE TIME STAMPED PORTIONS OF EGRESS RESPONSE
PACKETS FROM THE NETWORK I/O DEVICE AND PLACE THE
RECEIVED TIME STAMPED PORTIONS OF THE EGRESS
RESPONSE PACKETS IN THE TRANSACTION TABLE
1504
```

```
MATCH TIME STAMPED PORTIONS OF INGRESS REQUEST
PACKETS WITH TIME STAMPED PORTIONS OF EGRESS
RESPONSE PACKETS PLACED IN THE TRANSACTION TABLE
BASED ON INFORMATION INCLUDED WITH RESPECTIVE
TIME STAMPED PORTIONS OF THE INGRESS REQUEST AND
THE EGRESS RESPONSE PACKETS
1506
```

```
USE FIRST AND SECOND TIME STAMPS FOR RESPECTIVE
MATCHED TIME STAMPED PORTIONS OF INGRESS REQUEST
AND EGRESS RESPONSE PACKETS TO DETERMINE SEPARATE
TRANSACTION LATENCY VALUES FOR TRANSACTIONS
EXECUTED BY THE SERVER
1508
```

```
GATHER THE DETERMINED SEPARATE TRANSACTION
LATENCY VALUES IN A PLURALITY OF TIME INCREMENTED
BUCKETS
1510
```

```
DETERMINE WHICH TIME INCREMENTED BUCKET
INCLUDES AN $N^{TH}$ PERCENTILE DETERMINED TRANSACTION
LATENCY VALUE AND SORT THIS BUCKET TO DETERMINE
THE $N^{TH}$ PERCENTILE TRANSACTION LATENCY VALUE
1512
```

```
REPORT TRANSACTION LATENCY INFORMATION
1514
```

*FIG. 15*

Storage Medium 1600

*Computer Executable Instructions for 1500*

- DETERMINE TRANSACTION LATENCY VALUES BASED ON TIME STAMPED PORTIONS OF INGRESS REQUEST PACKETS MATCHED TO TIME STAMPED PORTIONS OF EGRESS RESPONSE PACKETS THAT ARE RECEIVED FROM A NETWORK I/O DEVICE COUPLED TO THE SERVER
  1802

- CAUSE AN AMOUNT OF POWER PROVIDED TO THE SERVER TO BE ADJUSTED BASED ON A COMPARISON OF TRANSACTION LATENCY VALUES DETERMINED BY THE LATENCY MODULE TO A GIVEN TRANSACTION LATENCY TARGET VALUE
  1804

*FIG. 18*

Storage Medium 1900

Computer Executable Instructions for 1800

*FIG. 19*

TECHNIQUES ASSOCIATED WITH SERVER TRANSACTION LATENCY INFORMATION

BACKGROUND

Large data centers hosting possibly hundreds of services may span across many servers (physical or virtual). Customers or consumers of these hosted services may complain of slow or unacceptable performance. In order to track down the source causing the slowdown or degradation of performance, a team of information technology (IT) experts may be deployed. This team of IT experts may analyze application logs and server resource metrics to find the offending server in a given data center. Often, due to a possibly complex mapping of services to underlying server hardware, it may take up to several days to find the offending server causing the slowness. Complexity increases even more in virtualized cloud computing environments having services mapped to numerous virtual servers supported by physical servers in a data center. Traditional models for troubleshooting problematic servers may be based on mapping service level agreements (SLAs) to customer performance issues. Once the mapping is done, server resource metrics (e.g., processor, storage, memory, etc.) for servers in a data center are analyzed to identify probable candidate servers that may be the offending server. A next level of troubleshooting may include turning on additional levels of logging at application, middleware or infrastructure layers to identify a root-cause. However, due to the complex mapping of services to underlying virtual and/or physical infrastructure in a data center, no obvious correlation appears to exist between SLAs and the underlying virtual and/or physical infrastructure in the data center.

BRIEF DESCRIPTION OF THE DRAWINGS

FIG. 3 illustrates example transaction tables.
FIG. 12 illustrates an example of a first logic flow.
FIG. 13 illustrates an example of a first storage medium.
FIG. 15 illustrates an example of a second logic flow.
FIG. 16 illustrates an example of a second storage medium.
FIG. 18 illustrates an example of a third logic flow.
FIG. 19 illustrates an example of a third storage medium.

DETAILED DESCRIPTION

Figure 1:
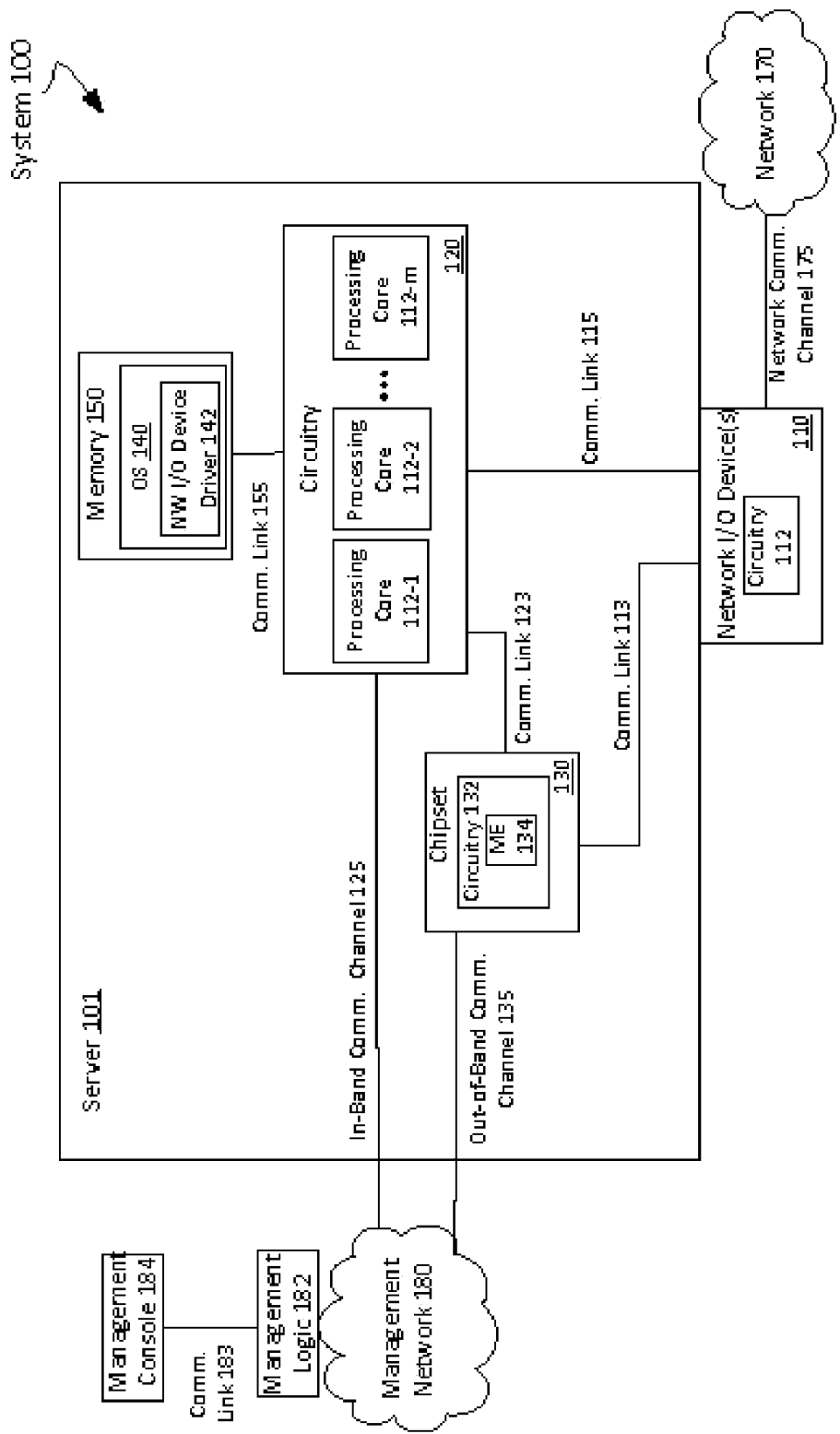
FIG. 1 illustrates a first example system.

As contemplated in the present disclosure, no obvious correlation appears to exist between SLAs and the underlying virtual and/or physical infrastructure in the data center. Service performance monitors may be placed in various parts of a data center to focus on transaction processing performance observed at given servers (e.g., front-end servers). However, these active monitors may be application specific, and therefore may be difficult to widely implement across possibly hundreds of services supported by many servers. Another approach may be to install probes on every hosting server to monitor and report network packet information going through physical or virtual switches. Installing the probes on every hosting server can be both time consuming and expensive in large data centers. Also, the large amounts of data generated by such probing may be problematic to quickly and efficiently identifying the offending server. It is with respect to these and other challenges that the examples described herein are needed.

In some examples, techniques associated with server transaction latency information may be implemented. For these examples, circuitry for a network input/output (I/O) device may be capable of supporting one or more modules associated with time stamping ingress/egress packets. For example, a time stamp module may be executed by the circuitry to place time stamps on ingress request packets destined for a server coupled to the network I/O device and place separate time stamps on egress response packets sourced from the server. A capture module may also be executed by the circuitry to capture portions of separate ingress request packets and portions of separate egress response packets, the captured portions to identify the separately time stamped ingress request packets and the separately time stamped egress response packets. A forward module may also be executed by the circuitry to forward the captured portions with respective time stamps to the server.

According to some examples, circuitry at a server may also be capable of supporting one or more modules to determine transaction latency values. For example, a request module may be executed by the circuitry to receive time stamped portions of ingress request packets (e.g., from a network I/O device coupled to the server) and to place the received time stamped portions of the ingress request packets in a transaction table. A response module may also be executed by the circuitry to receive time stamped portions of egress response packets (e.g., from the network input/output device) and to place the received time stamped portions of the egress response packets in the transaction table. A match module may also be executed by the circuitry to match time stamped portions of ingress request packets with time stamped portions of egress response packets placed in the transaction table based on information included with respective time stamped portions of the ingress request and the egress response packets. A latency module may also be executed by the circuitry to use first and second time stamps for respective matched time stamped portions of ingress request and egress response packets to determine separate transaction latency values for transactions executed by the server. Further, a report module may also be executed by the circuitry to report information associated with the determined separate transaction latency values to a management logic. In some examples, the management logic may be capable of managing a plurality of servers.

FIG. 1 illustrates an example first system. As shown in FIG. 1, the example first system includes system 100. Also as shown in FIG. 1, system 100 includes a server 101 coupled to a network 170 and a management network 180. In some examples, server 101 may couple to network 170 via a network communication (comm.) channel 175 and couple to management network via in-band comm. channel 125 or out-of-band comm. channel 135. Also, as shown in FIG. 1, server 101 couples to one or more network I/O device(s) 110 (e.g., network interface card(s) (NIC)). Server 101 is also shown in FIG. 1 as including circuitry 120, a chipset 130, an operating system (OS) 140 or a memory 150. In some examples, as shown in FIG. 1, circuitry 120 may communicatively couple to chipset 130 and memory 150 via comm. links 123 and 155 respectively. Also, network I/O device(s) 110 may couple to circuitry 120 and chipset 130 via comm. links 115 and 113, respectively.

According to some examples, as shown in FIG. 1, management network 180 may include a management logic 182 and a management console 184. As described more below, elements of a server such as server 101 may communicate transaction latency information to a management network such as management network 180. For these examples, server 101 may be part of a data center including a plurality of servers (not shown) managed or controlled by management logic 182. In some examples, management logic 182 may forward information to management console 184 via a comm. link 183. The forwarded information, for example, may include alerts or other information related to possible performance targets being monitored by an operator using management console 184.

In some examples, network I/O device(s) 110 may include circuitry 112 capable of executing modules or features to time stamp ingress request packets and egress response packets. For these examples, a given ingress request packet may be associated with a given transaction for a service supported by elements of server 101 (e.g., circuitry 120, chipset 130, OS 140, memory 150). Also, a given egress response packet may be generated by those elements of server 101 in response to the given ingress request packet.

According to some examples, circuitry 112 may also be capable of executing modules or features to capture at least a portion of the given ingress request packet and the given egress response packet to uniquely identify the given time stamped ingress request packet and the given time stamped egress response packet. For these examples, the given ingress request and egress response packets may each have packet header information that may be captured to uniquely identify time stamped ingress request or egress response packets. The packet header information, for example may be obtained from transport control protocol/Internet protocol (TCP/IP) headers included in the given ingress request and egress response packets. The TCI/IP header information may include, for example, a source IP address, a destination IP address, source port, or destination port. The source IP address may identify a server that sent the ingress/egress packet and the destination IP address may identify a server destined to receive the ingress/egress packet. Also, source port may identify a service or application associated with the sending or generation of ingress/egress packet and the destination port may identify a service or application destined to receive the ingress/egress packet.

According to some examples, circuitry 112 may be configured to place time stamps on all or at least a sampling of ingress request and egress response packets and capture portions of these time stamped packets. A size or number of samples to time stamp and/or capture portions may depend, for example, on possible variations in network traffic patterns. Highly variable traffic patterns may require larger sample sizes as compared to consistent or less variable traffic patterns.

In some examples, circuitry 112 may also be capable of executing modules or features to forward the captured portions of the given ingress request and egress packets with respective time stamps to circuitry 120 or to circuitry 132 of chipset 130.

For examples where the time stamped portions are forwarded to circuitry 120, an operating system 140 maintained at memory 150 may be executed by one or more processing cores 112-1 to 112-m, where "m" is any positive whole integer greater than 2. According to some examples, operating system (OS) 140 may be capable of implementing a network I/O device driver 142. The captured portions may be forwarded via comm. link 115 to circuitry 120 and then used by network I/O device driver 142 to determine a transaction latency time value based on the included time stamps. The transaction latency time value may then be reported by either OS 140 or network I/O device driver 142 to management logic 182 via in-band comm. channel 125. Since, management logic 182 has direct access to the determined transaction latency time value (e.g., via network I/O device driver 142 or OS 140) the communication is considered to be an in-band communication.

For examples where the time stamped portions are forwarded to circuitry 132 at chipset 130, circuitry 132 may support a manageability engine (ME) 134. For these examples, the captured portions may be forwarded to ME 134 and used by ME 134 to determine a transaction latency time value based on the included time stamps. Rather than using an in-band comm. channel, ME 134 may forward the transaction latency time value to management logic 182 via out-of-band comm. channel 135. According to some examples, ME 134 and/or other elements supported by circuitry 132 may communicate with management logic 182 in accordance with one or more remote management standards or specifications. The one or more remote management specifications may include specifications (including progenies and variants) such as the Intelligent Platform Management Interface Specification (IPMI), Second Generation, version 2.0, revision 1.0, published in February 2004 (hereinafter "the IPMI specification"). Although not shown in FIG. 1, a base management controller (BMC) at server 101 (not shown) may also be utilized by ME 134 to communicate with management logic 182 via an IPMI compliant out-of-band comm. channel 135.

According to some examples, various comm. links of server 101 such as comm. links 113, 115, 123 or 155 may be operated according to one or more industry standards or specifications (including progenies or variants) to include the Peripheral Component Interconnect (PCI) Express Base Specification, revision 3.0, published in November 2010 ("PCI Express" or "PCIe"). Also, the captured portions may be forwarded from network I/O device 110 to the circuitry maintained at server 101 using a transport protocol such as those described in progenies and variants of the Management Component Transport Protocol (MCTP) Host Interface Specification (DSP0256), version 1.0, published in July of 2010 by the Distributed Management Task Force (DMTF), referred hereinafter as "the MCTP specification".

Figure 2:
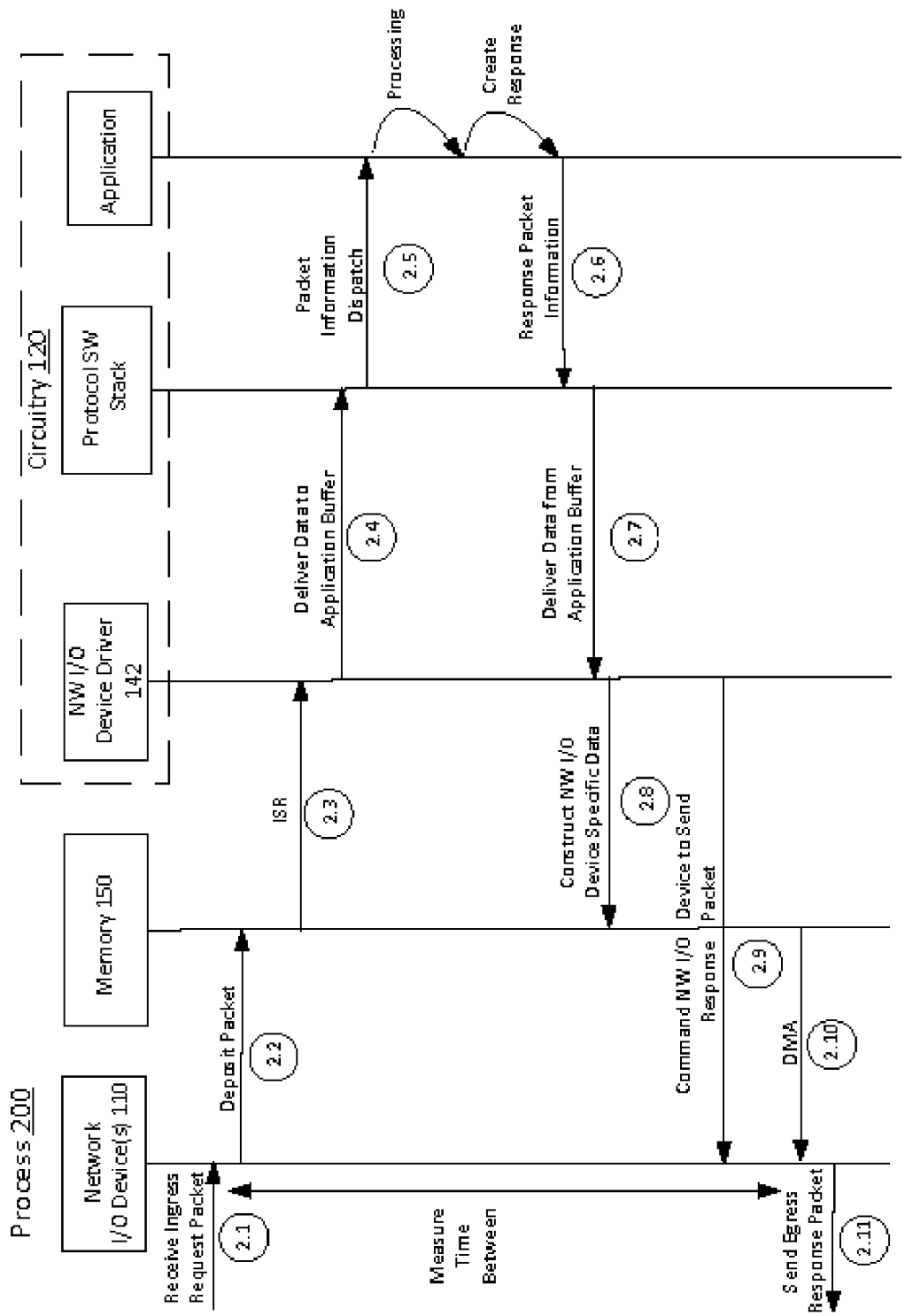
FIG. 2 illustrates an example process.

FIG. 2 illustrates an example process 200. In some examples, elements of system 100 as shown in FIG. 1 may be used to illustrate example operations related to process 200 depicted in FIG. 2. For these examples, process 200 provides an example of at least some of the general processes an ingress request packet may go through when received at network I/O device(s) 110, processed by elements of server 101 and then transmitted as an egress response packet to complete a transaction. The described example operations are not limited to implementations on system 100 or to the elements described therein for FIG. 1.

Beginning at process 2.1 (Receive Ingress Request Packet), an ingress request packet may be received at network I/O device(s) 110. In some examples, as shown in FIG. 1, the ingress request packet may be received via communication channel 175 from network 170. In some other examples, circuitry 120 of server 101 may be capable of supporting a multitude of virtual servers. For these examples, the ingress request packet may actually be received from one of these virtual servers and may be destined for another virtual server from these virtual servers. As mentioned above, circuitry 112 of network I/O device(s) 110 may be capable of time stamping individual ingress request packets and capturing at least portions (e.g., TCP/IP header information) of the time stamped packets for unique identification.

Proceeding to process 2.2 (Deposit Packet), information or data included in the received ingress request packet may be deposited in memory 150. In some examples, circuitry 112 may work in cooperation with circuitry 120 to deposit the information or data in memory 150.

Proceeding to process 2.3 (ISR), circuitry 112 may cause an interrupt service routine (ISR) to be generated to trigger execution of a network I/O device driver 142 by elements of circuitry 120. According to some examples, OS 140 may use the ISR to activate network I/O device driver 142.

Proceeding to process 2.4 (Deliver Data to Application Buffer), network I/O device 142 delivers relevant data for the request packet to an application buffer. In some examples, the application buffer may be maintained in one or more memory structures at memory 150 that may be configured to support an application buffer for an application. The application, for example may be supported or executed by elements of circuitry 120 and may be associated with providing a service for server 101.

Proceeding to process 2.5 (Packet Information Dispatch), a protocol software (SW) stack supported or executed by circuitry 120 may dispatch data or information associated with the request packet to an application executed by circuitry 120. According to some examples, once the request packet data or information is dispatched, the application then processes the data or information.

Proceeding to process 2.6 (Response Packet Information), following processing of the data or information associated with the request packet, a response is created or generated by the application.

Proceeding to process 2.7 (Deliver Data from Application Buffer), the protocol SW stack may deliver data associated with the response from the application buffer. In some examples, as mentioned above, the application buffer may be maintained in memory 150.

Proceeding to process 2.8 (Construct NW I/O Device Specific Data), network I/O device driver 142 may construct specific data for network I/O device(s) 110. According to some examples, this data may include TCP/IP header information for a response packet that includes, but is not limited to, a source IP address, a destination IP address, a source port or a destination port.

Proceeding to process 2.9 (Command NW I/O Device to Send Response Packet), network I/O device driver 142 may command network I/O device(s) 110 to send the response packet.

Proceeding to process 2.10 (DMA), direct memory access (DMA) to memory 150 may be arranged for network I/O device(s) 110 to obtain data to be included in the response packet.

Ending with process 2.11 (Send Egress Response Packet), network I/O device(s) 110 may send the response packet. As mentioned above, circuitry 112 of network I/O device(s) 110 may be capable of time stamping individual egress response packets and capturing at least portions (e.g., TCP/IP header information) of the time stamped packets for unique identification.

According to some examples, the difference in time between a first time stamp placed on the received ingress request packet and a second time stamp placed on the sent egress response packet equates to a transaction latency value. The transaction latency value, for example, may be indicated in units of time such as milliseconds (ms). As described more below, circuitry for server 101 to include circuitry 120 or circuitry 132 may be capable of supporting modules and/or features to determine transaction latency values for transactions and to report those determined transaction latency values, e.g., to management logic 182.

FIG. 3 illustrates example transaction tables. As shown in FIG. 3, the transaction tables include a pending transaction table 310 and a completed transaction table 320. In some examples, circuitry maintained at a server may be capable of receiving time stamped portions of ingress request and egress response packets from elements or circuitry at a network I/O device coupled to the server. For example, circuitry 120 of server 101 may be capable of receiving time stamped portions from circuitry 122 at network I/O device(s) 110 and then place the received time stamped portions in pending transaction table 310 that may be maintained in memory 150. In other examples, circuitry 132 at chipset 130 may be capable of receiving and then placing time stamped portions in pending transaction table 310 that may be maintained in memory at chipset 130 (not shown). As shown in FIG. 3, the time stamped portions may include a time, a source IP address (SrcIP), a source port (SrcPort), destination IP address (DestIP) or destination port (DestPort). As mentioned previously, time stamped portions may uniquely identify ingress request or egress response packets and may be gathered from TCP/IP headers.

According to some examples, circuitry maintained at server 101 may also be capable of matching time stamped portions of ingress request packets with time stamped portions of egress response packets placed in the pending transaction table 310. For these examples, a match may be based on a matching address/port between a DestIP/DestPort for a first portion to a SrcIP/SrcIP for a second portion. For example, as shown in FIG. 3, a first time stamped portion having a time of 1.3677 ms may be matched to a second time stamped portion having a time of 18.2356 ms. The match may be determined based on the Dest/IP/DestPort for the time of 1.3677 ms indicating an ingress request packet destined for an address/port that matches a SrcIP/SrcPort for the time of 18.2356 ms that indicates an egress response packet coming back in response to the ingress request packet. The matching of the portions may indicate a completed transaction.

In some examples, circuitry maintained at the server may determine a transaction latency value for completed transactions. For example, circuitry maintained at server 101 may determine the difference in time between the matched time stamped portions mentioned above for pending transaction table 310. As shown in FIG. 3, the transaction latency value indicating a difference of 16.8679 ms may be placed in completed transaction table 320. Also, the DestIP and DestPort information from the ingress request portion included in pending transaction table 310 may be used to identify the server and service associated with the determined transaction latency value. After placing the time value, DestIP and DestPort information in completed transaction table 320, time stamped portions for time 1.3677 ms and 18.2356 ms may be removed from pending transaction table 310.

According to some examples, other determined transaction latency values may be placed in completed transaction table 320. These other determined transaction latency values may also have been derived from matched time stamped portions placed in pending transaction table 310. As shown in FIG. 3, the other determined transaction latency values may also include DestIP and DestPort information.

In some examples, circuitry 112 at network I/O device(s) 110 may be capable of forwarding time stamped portions of ingress request or egress response packets at predetermined or configurable time intervals (e.g., every 2 seconds). For these examples, circuitry 120 at server 101 may continue to place time stamped portions in pending transaction table 310, match portions, determine transaction latency values and populated completed transaction table 320 during these predetermined or configurable time intervals. Circuitry 120 may stop receiving for another predetermined or configurable time to allow some time to match, determine transaction latency values and then remove entries from pending transaction table 310. Once the other time has expired, circuitry 120 may once again receive time stamped portions from circuitry at network I/O device(s) 110.

According to some example, circuitry 120 may also report information associated with determined transaction latency values to management logic 182. As mentioned above for FIG. 1, the reporting may be via in-band or out-of-band communication channels.

Figure 4:
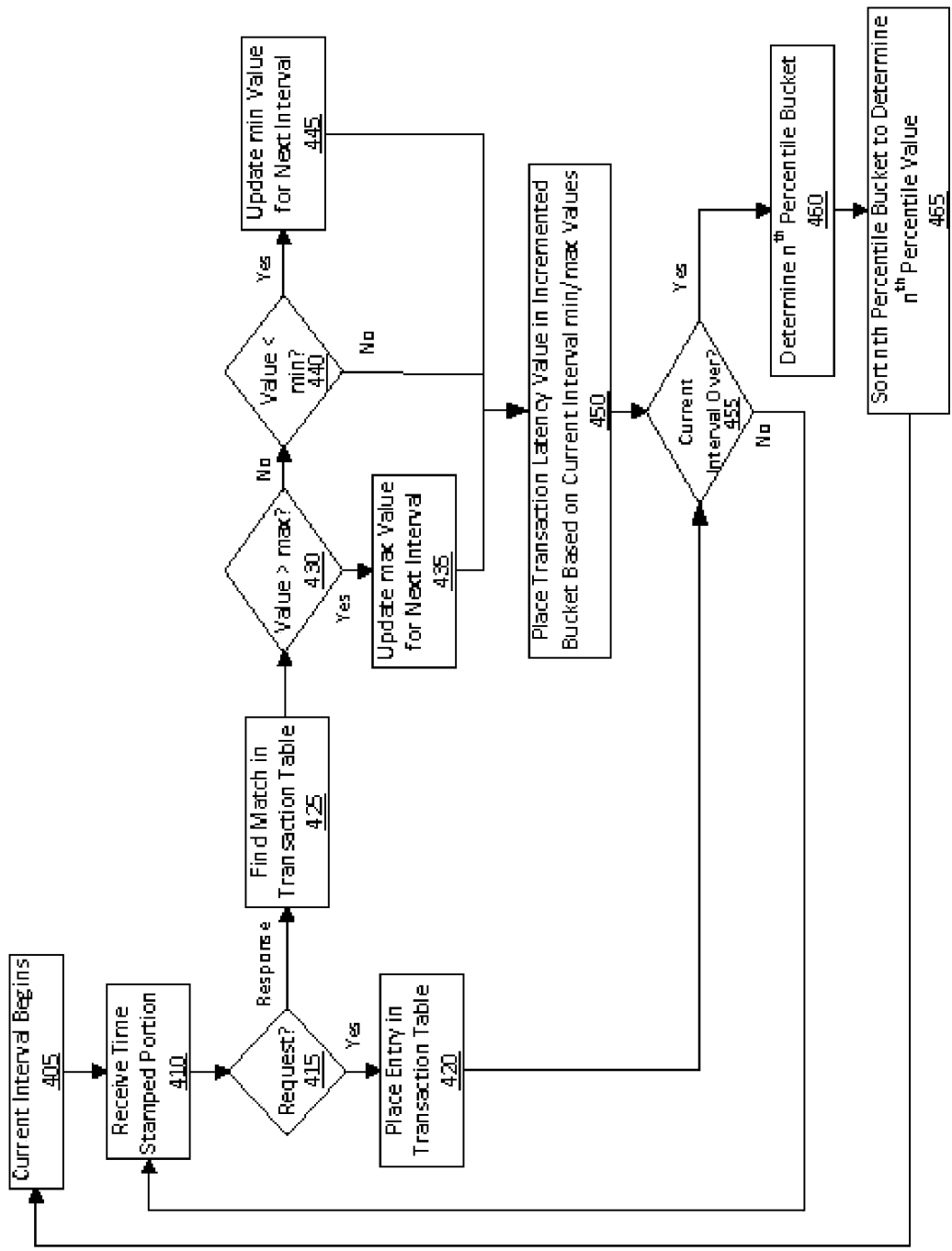
FIG. 4 illustrates an example flow diagram for reporting transaction latency information.

FIG. 4 illustrates an example flow diagram for reporting transaction latency information. In some examples, elements of system 100 as shown in FIG. 1 and the previous processes described in FIG. 2 and for FIG. 3 may be used to illustrate example operations related to the flow chart depicted in FIG. 4. The described example operations are not limited to implementations on system 100 or to the elements described therein for FIG. 1. The example operations are also not limited to the previous processes described in FIG. 2 or for FIG. 3.

Starting with block 405 (Current Interval Begins), a current time interval may be initiated by circuitry maintained at server 101. For example, circuitry 120 or circuitry 132 may initiate a timer. Time intervals may be predetermined and/or configurable to allow for a period of time (e.g., 2 seconds) to receive time stamped portions of ingress request or egress response packets from circuitry maintained at network I/O device(s) 110.

Proceeding from block 405 to block 410 (Receive Time Stamped Portion), elements executed or implemented by circuitry maintained at server 101 may receive the time stamped portion. In some examples, network I/O device driver 142 or ME 134 may be capable or configured to receive the time stamped portion from network I/O device(s) 110.

Proceeding from block 410 to decision block 415 (Request?), a determination is made as to whether the received portion is associated with an ingress request packet. According to some examples, the received time stamped portion may include TCP/IP header information. For these examples, circuitry maintained at server 101 may use DestIP and DestPort information in the received time stamped portion to determine whether the received portion is associated with an ingress request packet. For example, if an address for DestIP and a port for DestPort are not included in pending transaction table 310, the received portion is treated as an ingress request packet and the process moves to block 420. Otherwise, the process moves to block 425.

Moving from decision block 415 to block 420 (Place in Transaction Table), the received time stamped portion associated with the ingress request packet may be placed in pending transaction table 310 by circuitry maintained at server 101.

Moving from decision block 420 to block 425 (Find Match in Transaction Table), the received time stamped portion associated with an egress response packet may be matched to a previously placed time stamped portion associated with an ingress request packet by circuitry maintained at server 101. According to some examples, circuitry maintained at server 101 may use respective time stamps for the matched time stamped portions to determine a transaction latency value.

Proceeding from block 425 to decision block 430 (Value>max?), circuitry maintained at server 101 may compare the determined transaction latency value to a maximum (max) value for the current time interval. According to some examples, the max value for the current time interval may be based one or more previous time intervals. For these examples, the max value for the current time interval may have been initially set to some arbitrary max value and updated or changed to the current max value if that arbitrarily set max value was exceeded. If the determined transaction latency value exceeds or is greater than the current max value, the process moves to block 435. Otherwise the process moves to decision block 440.

Moving from decision block 430 to block 435 (Update max Value for Next Interval), circuitry maintained at server 101 may update the max value for a next time interval. In some examples, since the max value for the current interval was exceed by the determined transaction value, a new or updated max value may be established.

Moving from decision block 430 to decision block 440 (Time<min?), circuitry maintained at server 101 may compare the determined transaction latency value to a minimum (min) value for the current time interval. According to some examples, the min value for the current time interval may be based one or more previous time intervals. For these examples, the min value for the current time interval may have been initially set to some arbitrary min value and updated or changed to the current min value if that arbitrarily set min value was exceeded. If the determined transaction latency value falls below or is less than the current min value, the process moves to block 445. Otherwise the process moves to block 450.

Moving from decision block 440 to block 445 (Update min Value for Next Interval), circuitry maintained at server 101 may update the min value for the next time interval. In some examples, since the determined transaction value was below the min value for the current interval, a new or updated min value may be established.

Moving from block 435, decision block 440 or block 445 to block 450 (Place Transaction Latency Value in Incremented Bucket Based on Current Interval min/max Values), circuitry maintained at server 110 may place the determined transaction latency value in an incremented bucket based on min/max values for the current time interval. According to some examples, incremented buckets may have been determined based on established min/max values. For example, the min value for the current time interval may be 1 ms and max value for the current time interval may be 100 ms. If 100 buckets were established, then a first bucket would be set to receive determined transaction latency values between 0 ms and 1 ms, the second bucket would be set to receive determined transaction latency values between 1 ms and 2 ms. Subsequent buckets may be established at increments of 1 ms up until the last bucket is set to receive determined transaction latency values between 99 ms and 100 ms. Alternatively, if 100 buckets were established but the min value was 1 ms and the max value was 500 ms, then each bucket would be then be incremented by 5 ms. For examples of buckets incremented at 1 ms, if the determined transaction value was 16.8679 ms as shown in FIG. 3, then this determined transaction value would be placed in the $17^{th}$ incremented bucket.

In some examples, rather than incrementing the buckets linearly, other algorithms may be implemented by circuitry maintained at server 101 to determine how to increment the buckets. For example, if determined transaction latency values are non-evenly distributed between the current min/max values, some sort of dynamic bucketing may occur that recognizes when a given incremented bucket may become too large for its allocated size (e.g., allocated memory addresses) and allocates new bucket accordingly. The dynamically allocated buckets may break down an overly-subscribed time or determined transaction latency value cluster into sub-clusters such that smaller incremented buckets can hold the sub-clusters. This breakdown may occur repeatedly allowing for successively smaller sub-clusters.

According to some examples, circuitry maintained at server 110 may adjust the increments for the buckets for the next interval if either a new max or new min value was determined. For these examples, determined transaction latency values over the next time interval may then be placed in these updated, incremented buckets.

In some examples, the incremented buckets may be associated with separate blocks of memory maintained at server 101 and accessible to circuitry maintained at server 101. For example, the separate blocks of memory may be maintained in memory 150 and may be accessible to elements supported by circuitry 120 (e.g., network I/O device driver 142). In alternative examples, the separate blocks of memory may be maintained at chipset 130 (not shown) and may be accessible to elements supported by circuitry 132 (e.g., ME 134).

Proceeding from block 420 or block 450 to decision block 455 (Current Interval Over?), circuitry maintained at server 101 may determine whether the current interval is over (e.g., timer expires). In some examples, the current interval may be for 2 seconds. This disclosure contemplates other time intervals larger or smaller than 2 seconds. If the current interval is over, the process moves to block 460. Otherwise, the process moves to block 410 for the continued receipt of additional time stamped portions.

Moving from decision block 455 to block 460 (Determine $n^{th}$ Percentile Bucket), circuitry maintained at server 101 may determine which incremented bucket is the $n^{th}$ percentile bucket. According to some examples, the $n^{th}$ percentile bucket may be based on "n" equaling any positive integer less than or equal to 100. If n=95, then the $95^{th}$ percentile bucket is determined. The $95^{th}$ percentile bucket may include one or more determined transactions latency values placed in this bucket over the current time interval such that these transaction latency values have values greater than or equal to 95% of transaction latency values placed in other incremented buckets.

According to some examples, determining the $n^{th}$ percentile bucket may facilitate a relatively fast way to identify a group of transaction latency values placed in an incremented bucket that may include a statistical value such as the $95^{th}$ percentile latency transaction value. This identification may be quicker and may require less resources (e.g., memory resources) than having to determine the $95^{th}$ percentile latency by looking at all transaction latency values placed in all of the incremented buckets.

Moving from block 460 to block 465 (Sort $n^{th}$ Percentile Bucket to Determine $n^{th}$ Percentile Value), circuitry maintained at server 101 may sort the identified $n^{th}$ percentile bucket. In some examples, once the $n^{th}$ percentile bucket is sorted, the circuitry maintained at server 101 may determine the $n^{th}$ percentile transaction latency value for the current time interval. For example, a $95^{th}$ percentile transaction latency value would have 95% of the determined transaction latency values below that value and 5% above that value. The circuitry maintained at server 101 may then report the $n^{th}$ percentile transaction latency value to management logic 182. The $n^{th}$ percentile may be reported after each time interval or may be reported at other time intervals that may include average $n^{th}$ percentile values over the other time intervals. The process then moves back to block 405 for the beginning of another interval.

Figure 5:
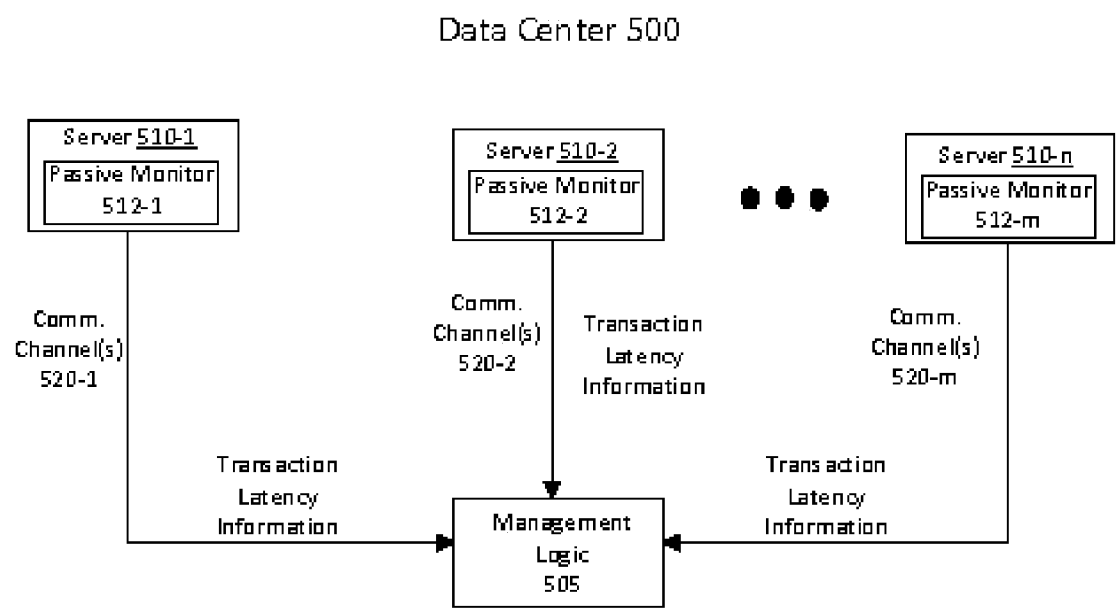
FIG. 5 illustrates a first example data center.

FIG. 5 illustrates a first example data center. As shown in FIG. 5, the first example data center includes data center 500. According to some examples, data center 500 includes servers 510-1 to 510-$m$ coupled to management logic 505 via respective communication channels 520-1 to 520-$m$, where "m" equals any positive integer greater than 2. Communication channels 520-1 to 520-$m$ may include in-band or out-of-band communication channels via which passive monitors 512-1 to 512-$m$ may forward or report transaction latency information to management logic 505.

According to some examples, passive monitors 512-1 to 512-$m$ may include one or more network I/O devices having circuitry capable of time stamping ingress request and egress response packets and capturing portions of these time stamped packets. Passive monitors 512-1 to 512-$m$ may also include circuitry maintained at servers 510-1 to 510-$m$ capable of receiving the captured time stamp portions from the network I/O devices and determining separate transaction latency values for matched pairs of ingress request and egress response packets based on the time stamped portions. The circuitry maintained at servers 510-1 to 510-$m$ may also enable passive monitors 512-1 to 512-$m$ to report determined separate transaction latency values to management logic 505.

Figure 6:
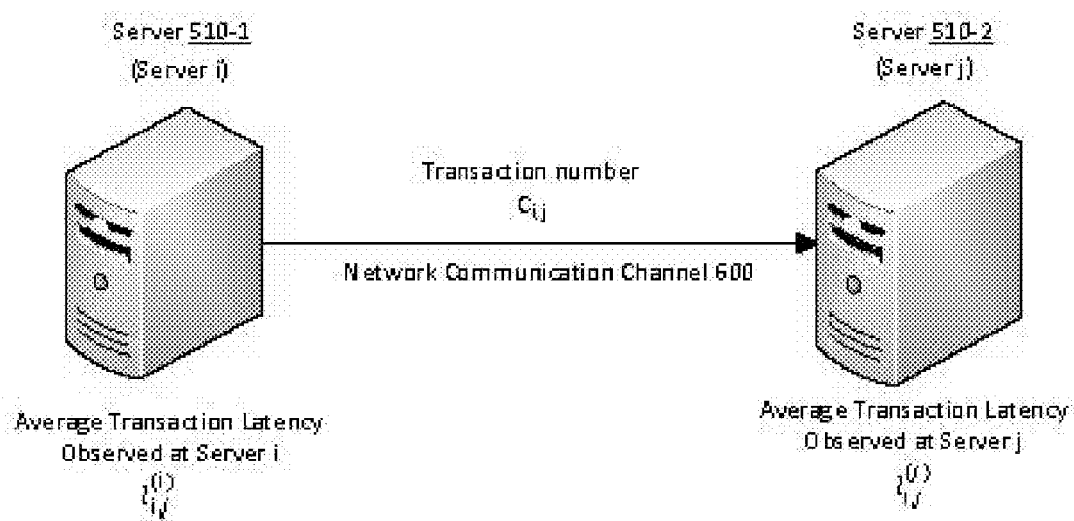
FIG. 6 illustrates example observed transaction latency between servers.

FIG. 6 illustrates example observed transaction latency between servers. As shown in FIG. 6, server 510-1 (server i) may be coupled to server 510-2 (server j) via a network communication channel 600. According to some examples, passive monitors 512-1 and 512-2 at servers 510-1 and 510-2 may monitor network traffic exchanged between these servers. For these examples, an incoming session at either of the two servers indicates that the server is providing a certain type of service while an outgoing session may indicate that the server is consuming a certain type of service provided by the other server. In each of these sessions, a number of transactions may occur.

According to some examples, let $c_{i,j}$ denote the number of transactions initiated from server i (510-1) to server j (510-2). Passive monitors 512-1 or 512-2 may be able to correlate incoming (ingress) request and outgoing (egress) response packets to calculate separate transaction latency values as described above for FIGS. 1-4. By collecting determined transaction latency values (or a representative sampling) on network communication channel 600, an average channel transaction latency value for network communication channel 600 may be calculated or determined. Also, let $l_{i,j}^{(i)}$ denote a first average transaction latency value from server i to server j observed at server i, and let $l_{i,j}^{(j)}$ denote a second average transaction latency value from server i to server j observed at server j.

In some examples, management logic 505 may be capable of building a service topology for data center 500. For these examples, the service topology may be a directed graph where each of the vertices maps to a server. Given one or more network sessions initiated from server i (510-1) to server j (510-2) (that is $c_{i,j} > 0$), an arc directing from the corresponding vertex i to the corresponding vertex j may be presented.

According to some examples, co transactions may occur across network communication channel 600 between server i (510-1) and server j (510-2) during a given monitoring cycle, time interval or time period. Average transaction latency values observed at server i and server j may be different in which the difference comes from the average channel transaction latency for network communication channel 600. As a result, example equation (1) may be used to determine the average channel transaction latency for network communication channel 600.

$$l_{i \to j} \leftarrow l_{i,j}^{(i)} - l_{i,j}^{(j)} \qquad \text{Example equation (1)}$$

Figure 7:
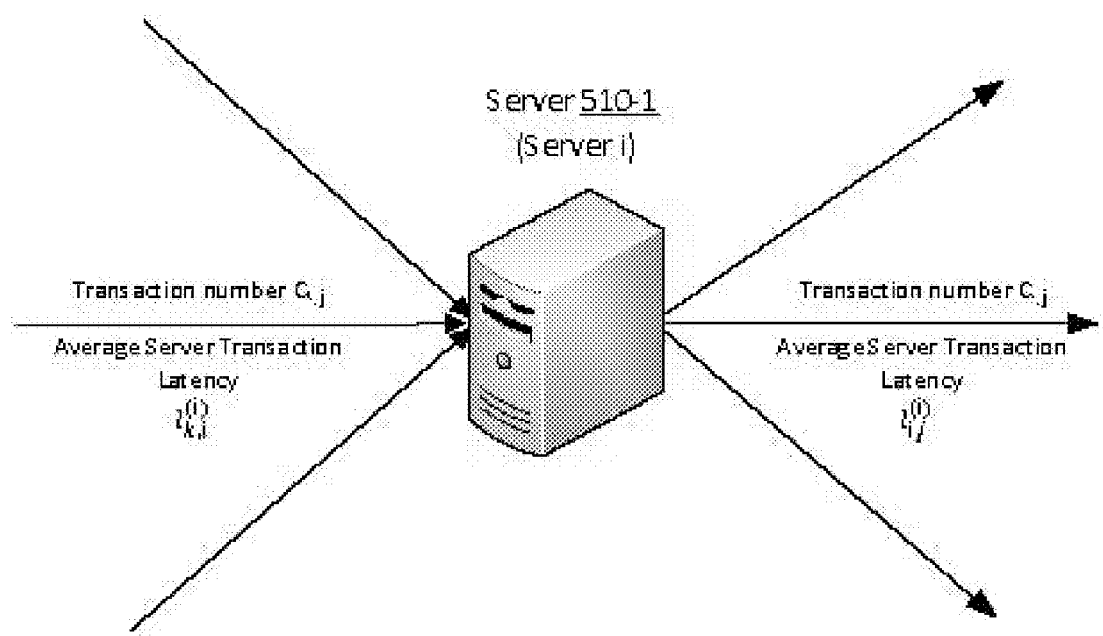
FIG. 7 illustrates example observed transaction latency at a server.

FIG. 7 illustrates example observed transaction latency at a server. As shown in FIG. 7, server i (510-1) is shown with incoming and outgoing arrows to illustrate incoming and outgoing transactions over various network communication channels. According to some examples, a total number of incoming transactions over a first monitoring cycle or time period may be denoted by $$\sum_k c_{k,i},$$

while a total time accumulated in serving transaction by server i and other servers (e.g., including server j) may be denoted by $$\sum_k c_{k,j} l_{k,i}^{(i)}.$$

Also, in processing transactions at server i, server i may parse the transactions and generate new requests served by other servers. A total time accumulated in transmitting the new requests via network communication channels and in serving them by the other servers may be denoted by $$\sum_k c_{i,j} l_{i,j}^{(i)}.$$

According to some examples, the difference between $$\sum_k c_{k,i} l_{k,i}^{(i)} \text{ and } \sum_j c_{i,j} l_{i,j}^{(i)}$$

may specify a total time accumulated in processing transactions on server i. As a result, average transaction latency values on server i may be calculated or determined using example equation (2).

$$\frac{\sum_k c_{k,i} l_{k,i}^{(i)} - \sum_j c_{i,j} l_{i,j}^{(i)}}{\sum_k c_{k,i}} \qquad \text{Example equation (2)}$$

According to some examples, determined transaction latency values for $l_i$ and $l_i \to j$ may be assigned to vertices and arcs respectively in a topology of servers deployed in data center 500. The resulting topology may result in a latency distribution graph or topological graph that includes an average channel transaction latency for network communication channel 600 as well as an average server transaction latency value for server i (server 510-1). For these examples, management logic 505 may include logic and/or features capable of using example equations (1) and (2) for other servers in data center 500 to complete a more detailed topological graph based on transaction latency values received from passive monitors for servers included in da7ta center 500.

Figure 8:
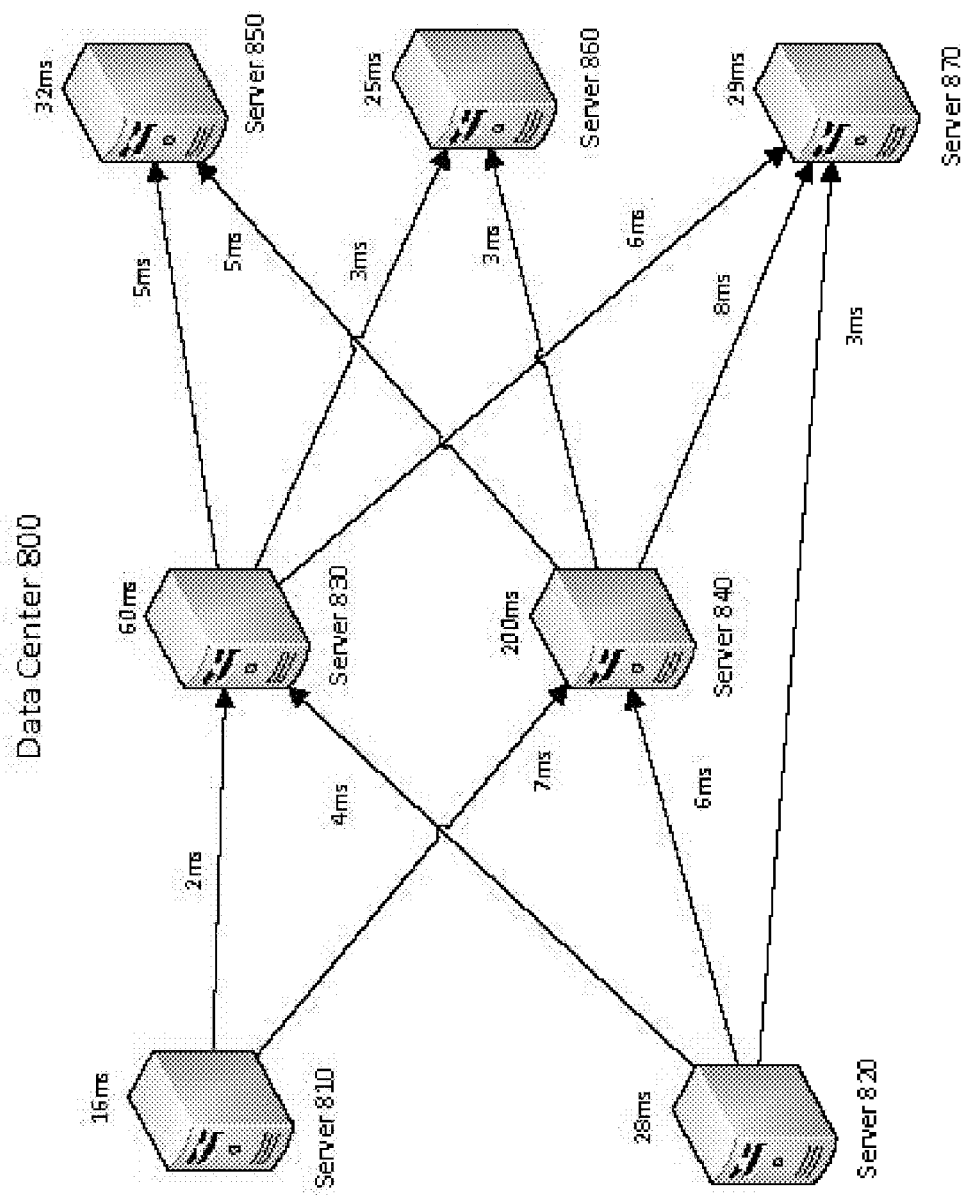
FIG. 8 illustrates a second example data center.

FIG. 8 illustrates a second example data center. As shown in FIG. 8, the second example data center includes data center 800. In some examples, as shown in FIG. 8, data center 800 includes servers 810 to 870. For these examples, determined average channel transaction latency values for network communication channels and average server transaction latency values are shown in a topological graph. For example, server 810 shows an average server transaction latency value of 16 ms. Also network communication channels to server 830 and 840 have average channel transaction latency values of 2 ms and 7 ms, respectively.

According to some examples, management logic for data center 800 may include logic and/or features to generate the topological graph shown in FIG. 8. For these examples, the management logic may use example equations (1) and (2) to generate the topological graph. The topological graph may be generated and/or updated on a repeated basis following a given monitoring cycle or time period (e.g., every few seconds).

In some examples, the topological graph shown in FIG. 8 may provide a visual representation of transaction latency values for servers in a data center managed by the management logic.

Figure 9:
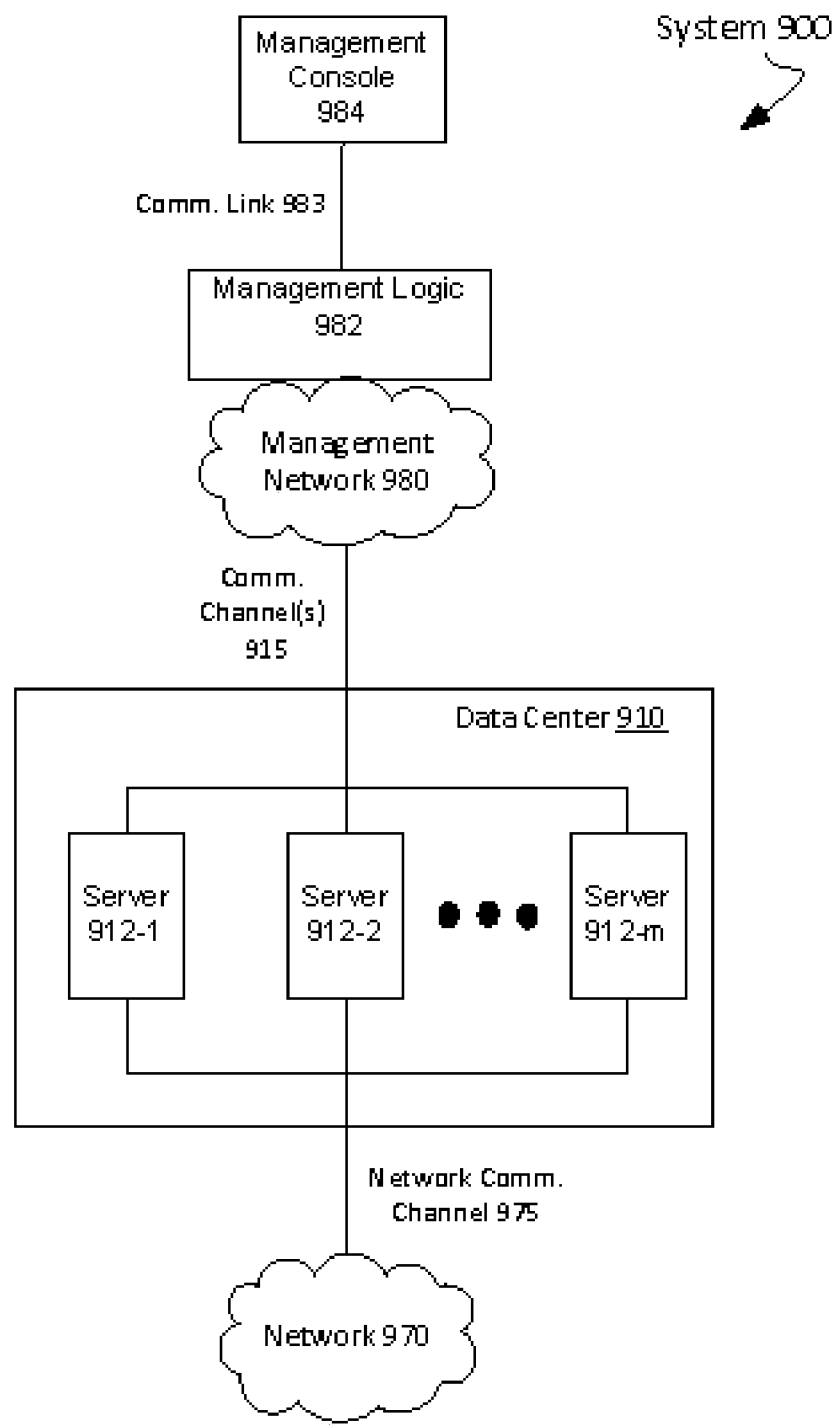
FIG. 9 illustrates a second example system.

FIG. 9 illustrates a second example system. As shown in FIG. 9, the second example system includes system 900. In some examples, as shown in FIG. 9, system 900 includes a data center 910 having servers 912-1 to 912-m coupled to network 970 via network comm. channel 975 and to management network 980 via comm. channel(s) 915. Also, as shown in FIG. 9, management network 980 may include a management logic 982 coupled to a management console 984 via a comm. link 983.

In some examples, management logic 982 may include logic and/or features to receive transaction latency values from servers 912-1 to 912-*m*. For these examples, management logic 982 may receive the transaction latency values responsive to a polling request. Alternatively, management logic 982 may receive the transaction latency values at regular monitoring intervals. Management logic 982 may compare the received transaction latency values to target transaction latency values associated with servers 912-1 to 912-*m* and/or services provided by the plurality of servers (e.g., web services, application hosting services or database services). Management logic 982 may generate an alert based on one or more servers from among servers 912-1 to 912-*m* providing transaction latency values that exceed the target transaction latency values. The generated alert may be sent to management console 984 which may be configured to allow an operator to monitor performance of servers 912-1 to 912-*m*. The alert may indicate the give target transaction latency value(s) exceeded and identify the server(s) and/or service(s) associated with the transaction latency value(s) that exceed the target.

According to some examples, servers 912-1 to 912-*m* may include passive monitors having at least one network I/O device to time stamp both ingress request packets and egress response packets. The at least one network I/O device may gather portions of separately time stamped ingress request and egress response packets to enable servers 912-1 to 912-*m* to identify separate transactions associated with services provided by servers 912-1 to 912-*m*. The passive monitors may also include circuitry to enable the servers 912-1 to 912-*m* to determine separate transaction latency values for the identified separate transactions associated with respective services. These separate transaction latency values to be reported to management logic 982 responsive to a polling request or at the end of given monitoring cycles or time periods.

In some examples, as mentioned previously, the gathered portions of separately time stamped packets may include information from TCP/IP headers for these packets. For these examples, a server from among servers 912-1 to 912-*m* associated with transaction latency value(s) that exceed a given target may be identified based on a destination IP address included in the gathered portions of separately time stamped egress response packets. Also, a service being provided by the server may be identified based on a destination port included in the gathered portions of the separately time stamped egress response packets.

According to some examples, transaction latency values received by management logic 982 from servers 912-1 to 912-*m* may include a moving average transaction latency value for one or more of the servers. The transaction latency values may also include a $95^{th}$ or $n^{th}$ percentile transaction latency values for one or more of the servers or any other types of statistical values associated with transaction latency values determined by passive monitors at servers 912-1 to 912-*m*.

In some examples, target transaction latency values may be established based on observing historical trends of performance for servers 912-1 to 912-*m* over periods of normal functioning (e.g., no noticeable performance issues) and/or during periods of stable network traffic. In order to allow for some variability in performance, guard-bands may be established that account for such efforts as burst workloads caused by bursts in network traffic that may result in temporary spikes in transaction latency values. For example, a guard band may double or triple a normally observed transaction latency value. The size of the guard band may depend on a level variability and/or frequency in variability.

Figure 10:
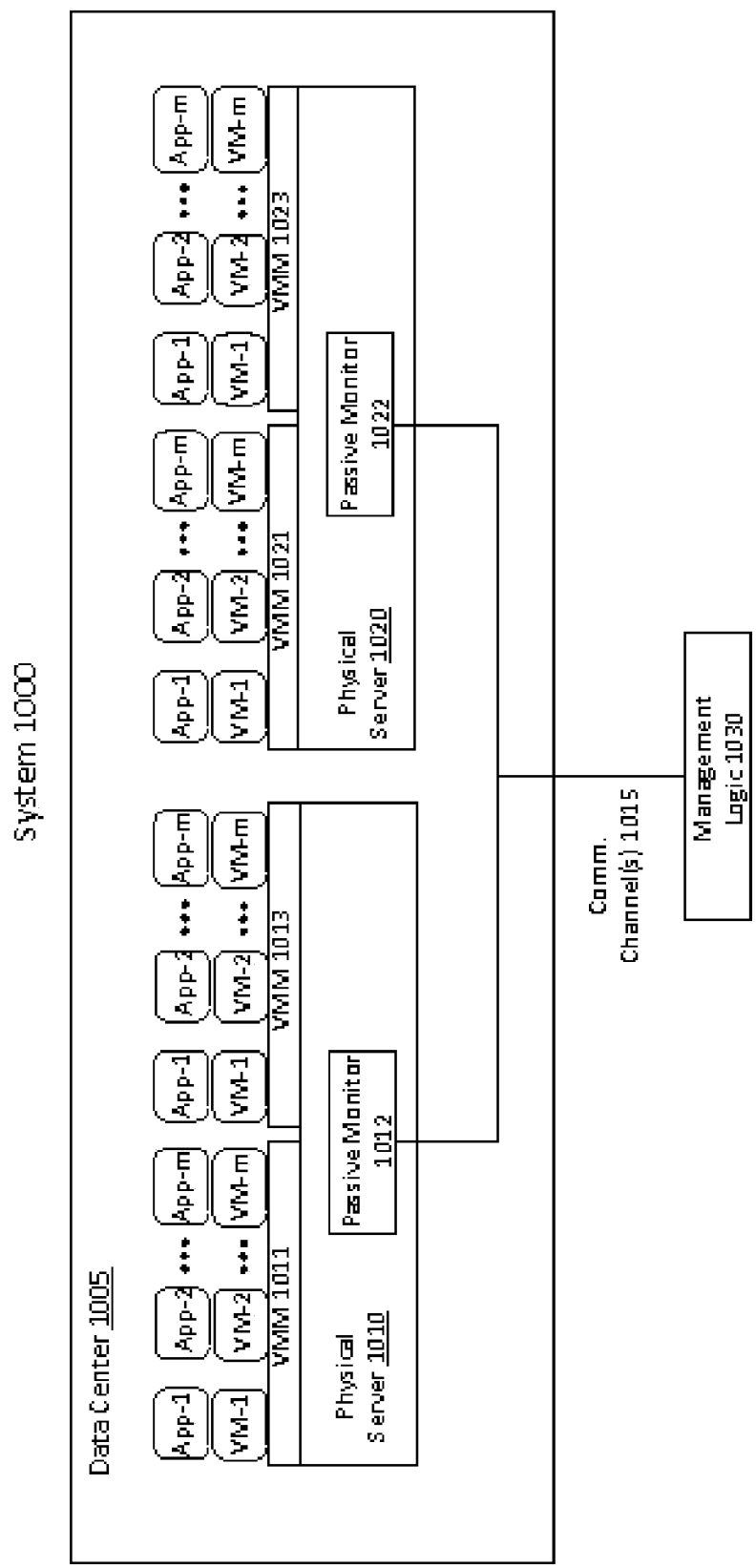
FIG. 10 illustrates a third example system.

FIG. 10 illustrates a third example system. As shown in FIG. 10, the third example system includes system 1000. In some examples, as shown in FIG. 10, system 1000 includes a data center 1005 having physical servers 1010 and 1020 coupled to management logic 1030 via comm. channel(s) 1015. Also, as shown in FIG. 10, physical server 1010 includes a passive monitor 1012 and virtual machine managers (VMMs) 1011 and 1013. Also, physical server 1020 includes a passive monitor 1022 and VMMs 1021 and 1023.

According to some examples, the VMMs included in either physical server 1010 or physical server 1020 may manage any number of virtual machines (VMs) shown in FIG. 10 as VM-1 to VM-p, where "p" represents any positive integer greater than 2. Also, VM-1 to VM-p may separately support at least one application (App) shown in FIG. 10 as App-1 to App-q, where "q" represent any positive integer greater than 2. Thus, VM-1 to VM-p may function as virtual servers. An App supported by a VM may represent a service supported by the VM. So passive monitors 1012 or 1022 may include circuitry maintained at either a network I/O device or at their respective physical servers 1010 or 1020 to determine transaction latency values for transactions completed by Apps supported by the various VMs. The transactions may be based on requests placed by VMs on a same physical server, VMs on different physical servers or from network sources (not shown).

In some examples, management logic 1030 may receive transaction latency values from physical servers 1010 and 1020 of data center 1005 via comm. channel(s) 1015. Management logic 1030 may receive the transaction latency values responsive to a polling request. Alternatively, management logic 1030 may receive the transaction latency values at regular monitoring intervals. For these examples, management logic 1030 may be attempting to set up an additional VM or virtual server and may use the received transaction latency values to determine which physical server has a better or adequate ability to support the additional VM. Transaction latency values may be at least one indicator of a given physical server's ability to support the additional VM. Other indications could include, but are not limited to, available processing capabilities, types and or amounts of available memory, etc.

According to some examples, transaction latency values may be associated with a target value that indicate a maximum or highest desirable transaction latency value for transactions serviced by a given App executed by a given VM on a given physical server. Management logic 1030 may use this target value to maintain acceptable performance levels for physical servers 1010 or 1020 in data center 1005 by balancing a number of VMs supported by physical servers 1010 and 1020 to try to keep these physical servers from exceeding the target value. The gap between a physical server's reported transaction latency value and the target value may be referred to as available headroom.

In some examples, management logic 1030 may determine available capacity (e.g., headroom) of physical servers 1010 or 1020 based, at least in part, on the received transaction latency values. For these examples, management logic 1030 may then assign the new virtual server to the physical server having a highest determined capacity or available headroom to support the new VM or virtual server. For example, management logic 1030 may determine that physical server 1010 has more headroom (e.g., lower reported transaction latency values) than does physical server 1020. Management logic 1030 may then arrange for the new VM or virtual server to be set up and supported by physical server 1010.

According to some examples, management logic 1030 may also determine that physical server 1020 may have exceeded the target value for transaction latency values. Exceeding the target value may indicate that physical server 1020 may need to have some VMs migrated or moved to physical server 1010, provided physical server 1010 has available headroom to support the migrated VM. Although not shown in FIG. 10, management logic 1030 may have additional physical servers in data center 1005 that may be utilized for a migration of the VM from physical server 1020. These additional physical servers may also send transaction latency values to management logic 1030 as mentioned above. If a physical server from among the additional physical servers has available headroom to support the migrated VM, the VM may be migrated to that physical server.

Figure 11:
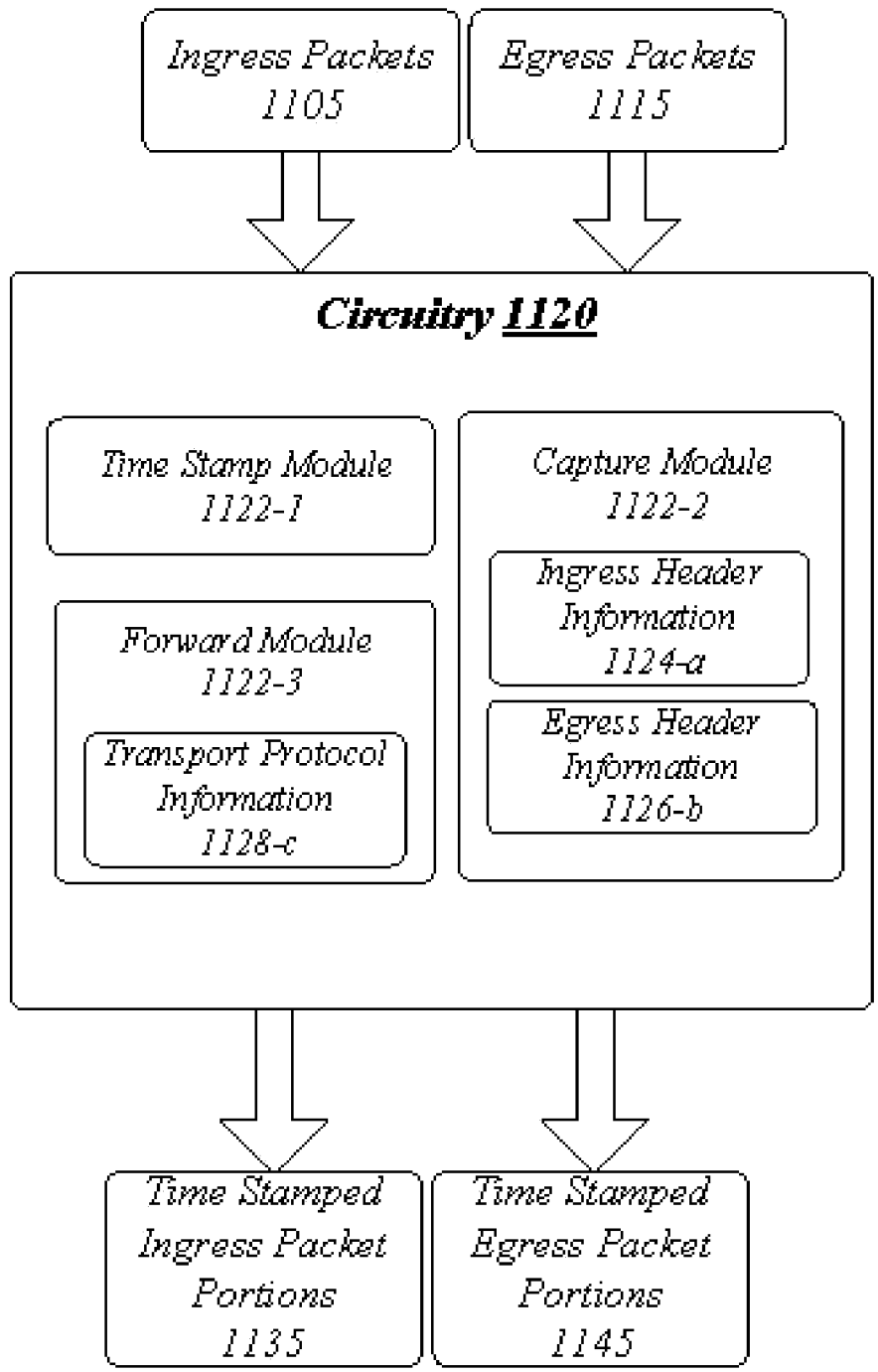
FIG. 11 illustrates an example block diagram for a first apparatus.

FIG. 11 illustrates an example block diagram for a first apparatus 1100. As shown in FIG. 11, the first apparatus includes an apparatus 1100. Although apparatus 1100 shown in FIG. 11 has a limited number of elements in a certain topology, it may be appreciated that the apparatus 1100 may include more or less elements in alternate topologies as desired for a given implementation.

The apparatus 1100 may be supported by circuitry 1120 maintained at a network I/O device coupled to a server. Circuitry 1120 may be arranged to execute one or more software or firmware implemented modules 1122-*a*. It is worthy to note that "a" and "b" and "c" and similar designators as used herein are intended to be variables representing any positive integer. Thus, for example, if an implementation sets a value for a=5, then a complete set of software or firmware for modules 1122-*a* may include modules 1122-1, 1122-2, 1122-3, 1122-4 or 1122-5. The examples presented are not limited in this context and the different variables used throughout may represent the same or different integer values.

According to some examples, circuitry 1120 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 1120 may also be an application specific integrated circuit (ASIC) and at least some modules 1422-*a* may be implemented as hardware elements of the ASIC.

According to some examples, apparatus 1100 may include a time stamp module 1122-1. Time stamp module 1122-1 may be capable of placing separate time stamps on ingress request packets 1105 destined for a server via which a network I/O device including apparatus 1100 is coupled. Time stamp module 1122-1 may also be capable of placing separate time stamps on egress response packets 1125 sourced from the server.

In some examples, apparatus 1100 may also include a capture module 1122-2. Capture module 1122-2 may be capable of capturing portions of separate ingress request packets 1105 and portions of separate egress response packet 1115. The captured portions may uniquely identify the separately time stamped ingress request packets and the separately time stamped egress response packets. According to some examples, the captured portions may be obtained from ingress header information 1124-*a* and egress header information 1126-*b*. Ingress header information 1124-*a* and egress header information 1126-*b* may have been obtained from separate TCP/IP headers for ingress request packets 1105 or egress response packets 1115. Capture module 1122-2 may be capable of at least temporarily storing the captured portions with respective time stamps (e.g., in a data structure such as a lookup table (LUT))

In some examples, apparatus 1100 may also include a forward module 1122-3. Forward module 1122-3 may be capable of obtaining (e.g., from a LUT) the captured portions with respective time stamps for ingress request packets 1105 or egress response packets 1115. The captured portions with respective time stamps may be forwarded as time stamped ingress packet portions 1135 and time stamped egress packet portions 1145. For these examples, time stamped ingress packet portions 1135 and time stamped egress packet portions 1145 may be forwarded to circuitry maintained at the server coupled to the network I/O device that includes apparatus 1100. Forward module 1122-3 may use transport protocol information 1128-*c* (e.g., maintained in a LUT) to format information forwarded to the circuitry maintained at the server (e.g., using MCTP and/or PCI-Express compliant protocols).

According to some examples, apparatus 1100 located at the network I/O device may function as a first part of a passive monitor for the server coupled to the network I/O device. As mentioned above for FIGS. 5 and 9, the passive monitor may include elements supported by circuitry maintained at both the network I/O device (e.g., circuitry 1120) and the server. As described more below, the circuitry maintained at the server may function as a second part of the passive monitor and may use forwarded, captured portions of time stamped ingress request and egress response packets to determine transaction latency values for the server.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 12 illustrates an example of a first logic flow. As shown in FIG. 12 the first logic flow includes a logic flow 1200. Logic flow 1200 may be representative of some or all of the operations executed by one or more logic, features, or devices described herein, such as apparatus 1100. More particularly, logic flow 1200 may be implemented by time stamp module 1122-1, capture module 1122-2 or forward module 1122-3.

According to some examples, logic flow 1200 may place separate time stamps on ingress request packets destined for a server coupled to a network I/O device having apparatus 1100 at block 1202. Logic flow 1200 at block 1202 may also place separate time stamps on egress response packets sourced from the server. For example, time stamp module 1122-1 may place the separate time stamps on ingress request packets 1105 and egress request packets 1115.

In some examples, logic flow 1200 may capture portions of separate ingress request packets and portions of separate egress response packets at block 1204. For these examples, the portions may be captured by capture module 1122-2 and may uniquely identify the separately time stamped ingress request packets 1105 and the separately time stamped egress response packets 1115.

In some examples, logic flow 1200 at block 1206 may forward the captured portions with respective time stamps to circuitry maintained at the server. For these examples, forward module 1122-3 may forward time stamped ingress packet portions 1135 and time stamped egress packet portions 1145 to the circuitry maintained at the server.

FIG. 13 illustrates an example of a first storage medium. As shown in FIG. 13, the first storage medium includes a storage medium 1300. The storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1300. Examples of computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
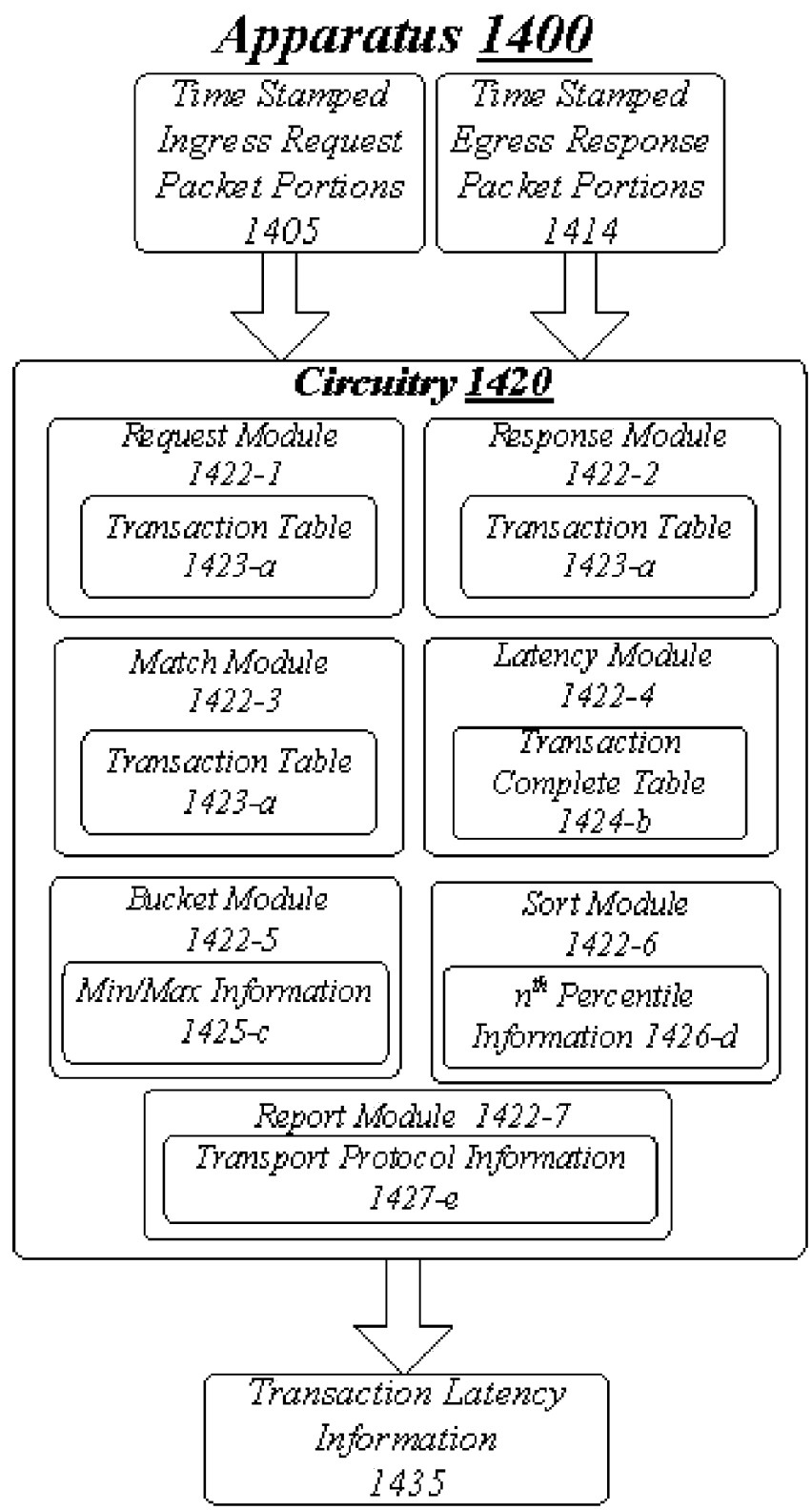
FIG. 14 illustrates an example block diagram for a second apparatus.

FIG. 14 illustrates an example block diagram for a second apparatus. As shown in FIG. 14, the second apparatus includes an apparatus 1400. Although apparatus 1400 shown in FIG. 14 has a limited number of elements in a certain topology or configuration, it may be appreciated that apparatus 1400 may include more or less elements in alternate configurations as desired for a given implementation.

The apparatus 1400 may be supported by circuitry 1420 maintained at a server. Circuitry 1420 may be arranged to execute one or more software or firmware implemented modules 1422-*a*. It is worthy to note that "a" and "b" and "c" and similar designators as used herein are intended to be variables representing any positive integer. Thus, for example, if an implementation sets a value for a=7, then a complete set of software or firmware for modules 1422-*a* may include modules 1422-1, 1422-2, 1422-3, 1422-4, 1422-5, 1422-6 or 1422-7. The examples presented are not limited in this context and the different variables used throughout may represent the same or different integer values.

In some examples, as shown in FIG. 14, apparatus 1400 includes circuitry 1420. Circuitry 1420 may be generally arranged to execute one or more software and/or firmware modules 1422-*a*. Circuitry 1420 may be part of a server's circuitry that includes processing cores (e.g., used as a central processing unit (CPU)). Alternatively circuitry 1420 may part of the circuitry in a chipset for the server. In either scenario, circuitry 1420 may be a part of any of various commercially available processors to include, but not limited to, those previously mentioned for circuitry 1120 for apparatus 1100. Circuitry 1420 may also be part of dual microprocessors, multi-core processors, and other multi-processor architectures. According to some examples, circuitry 1420 may also be an ASIC and modules 1422-*a* may be implemented as hardware elements of the ASIC included as part of the circuitry in the chipset (e.g., a manageability engine).

According to some examples, apparatus 1400 may include a request module 1422-1. Request module 1422-1 may be capable of receiving time stamped ingress request packet portions 1405 from a network I/O device coupled to the server having apparatus 1400. Request module 1422-1 may also be capable of placing the received time stamped ingress request packet portions 1405 in a transaction table 1423-*a* (e.g., maintained in a data structure such as a lookup table (LUT) or a scratch pad memory).

In some examples, apparatus 1400 may also include a response module 1422-2. Response module 1422-2 may be capable of receiving time stamped egress response packet portions 1415 from the network I/O device. Response module 1422-2 may also be capable of placing the received time stamped egress response packet portions 1415 in transaction table 1423-*a*.

In some examples, apparatus 1400 may also include a match module 1422-3. Match module 1422-3 may be capable of matching time stamped ingress request packet portions 1405 placed in transaction table 1423-*a* with time stamped egress response packet portions 1415 also placed in transaction table 1423-*a*. For these examples, information such as destination address/port included in the time stamped portions may be used to match respective time stamped portions of the ingress request and the egress response packets.

In some examples, apparatus 1400 may also include a latency module 1422-4. Latency module 1422-4 may be capable of using first and second time stamps for respective matched time stamped portions of ingress request and egress response packets to determine separate transaction latency values for transactions executed by the server and/or elements supported by the server (e.g., VMs or virtual servers). For these examples, determined transaction latency values may be placed in a transaction complete table 1424-*b*. Transaction complete table 1424-*b* may be maintained in a data structure such as LUT or a scratch pad memory. According to some examples, once a given transaction latency value is determined and placed in transaction complete table 1424-*b*, corresponding received time stamped ingress request packet portions 1405 and egress response packet portions 1415 may be removed from transaction table 1423-*a*.

According to some examples, apparatus 1400 may also include a bucket module 1422-5. Bucket module 1422-5 may be capable of gathering or obtaining the determined separate transaction latency values from transaction complete table 1424-*b* and place these values in a plurality of buckets during a current time interval. For these examples, each bucket may be associated with an incremented time difference and configured to maintain one or more of the separately determined transaction latency values based on a proximity of respective separately determined transaction latency values to a given incremented time difference. Also for these examples, each incremented time difference may be based on a span of time between a lowest determined transaction latency value and a highest determined transaction latency value from among the determined separate transaction latency values gathered over a previous time interval In some examples, apparatus 1400 may also include a sort module 1422-6. Sort module 1422-6 may be capable of to determine which bucket from among the plurality of buckets used by bucket module 1422-5 includes an $n^{th}$ percentile determined transaction latency value. Sort module 1422-6 may sort the bucket including the $n^{th}$ percentile determined transaction latency value to determine a given transaction latency value that equals the $n^{th}$ percentile determined transaction latency value.

According to some examples, apparatus 1400 may also include a report module 1422-7 Report module 1422-7 may be capable of reporting information associated with the determined separate transaction latency values to a management logic (e.g., associated with a management network and/or a management console) configured to manage a plurality of servers including the server that has apparatus 1400. Report module 1422-7 may use transport protocol information 1427-e (e.g., maintained in a LUT or other data structure) to format information reported to the management logic (e.g., using IPMI-compliant protocols). The information reported may include the $n^{th}$ percentile determined transaction latency value that resulted from sort module 1422-6's sorting of the incremented buckets. The information may also include, but is not limited to, other statistically related information such as a moving average determined transaction latency value or max/min determined transaction latency values.

According to some examples, apparatus 1400 supported by circuitry at the server coupled to the network I/O device may function as a second part of a passive monitor for the server. As mentioned above for FIG. 11, the passive monitor may include elements supported by circuitry maintained at both the network I/O device (e.g., circuitry 1120) and the server (e.g., circuitry 1420). Elements or modules of apparatus 1400 as mentioned above, may implement the second part of the passive monitor by using forwarded, captured portions of time stamped ingress request and egress response packets to determine transaction latency values for the server and then report the determined transaction latency values to a management logic communicatively coupled to the server.

Various components of apparatus 1400 and a device implementing apparatus 1400 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 15 illustrates an example of a second logic flow. As shown in FIG. 15, the second logic flow includes a logic flow 1500. Logic flow 1500 may be representative of some or all of the operations executed by one or more logic, features, or devices described herein, such as apparatus 1400. More particularly, logic flow 1500 may be implemented by request module 1422-1, response module 1422-2, match module 1422-3, latency module 1422-4, bucket module 1422-5, sort module 1422-6 or report module 1422-7.

In the illustrated example shown in FIG. 15, logic flow 1500 at block 1502 may receive time stamped portions of ingress request packets from a network input/output device coupled to the server and to place the received time stamped portions of the ingress request packets in a transaction table. For these examples, request module 1422-1 may receive time stamped ingress request packet portions 1405 and place these packet portions in transaction table 1423-a.

According to some examples, logic flow 1500 at block 1504 may receive time stamped portions of egress response packets from the network input/output device and to place the received time stamped portions of the egress response packets in the transaction table. For these examples, request module 1422-1 may receive time stamped egress response packet portions 1415 and place these packet portions in transaction table 1423-a.

According to some examples, logic flow 1500 at block 1506 may match time stamped portions of ingress request packets with time stamped portions of egress response packets placed in the transaction table based on information included with respective time stamped portions of the ingress request and the egress response packets. For these examples, match module 1422-3 may match time stamped ingress request packet portions 1405 placed in transaction table 1423-a with time stamped egress response packet portions 1415 also placed in transaction table 1423-a.

In some examples, logic flow 1500 at block 1508 may use first and second time stamps for respective matched time stamped portions of ingress request and egress response packets to determine separate transaction latency values for transactions executed by the server. For these examples, determined transaction latency values may be determined by latency module 1422-4 and then placed in a transaction complete table 1424-b.

According to some examples, logic flow 1500 at block 1510 may gather the determined separate transaction latency values in a plurality of time incremented buckets. For these examples, bucket module 1422-5 may gather the separate transaction latency values in buckets incremented based on min/max determined transaction latency values for a previous time interval. For examples, as described for FIG. 4, min/max determined transaction latency values may be updated during current time intervals and then used during subsequent time intervals to decide how the buckets may be incremented.

In some examples, logic flow 1500 at block 1512 may determine which time incremented bucket includes an $n^{th}$ percentile determined transaction latency value and then sort this bucket to determine the $n^{th}$ percentile determined transaction latency value. For these examples, sort module 1422-6 may first determine which bucket includes an $n^{th}$ percentile determined transaction latency value and then sort that bucket to find the $n^{th}$ percentile determined transaction latency value. According to some examples, the $n^{th}$ percentile determined transaction latency value may be a $95^{th}$ percentile determined transaction latency value.

According to some examples, logic flow at block 1514 may report transaction latency information. For these examples, report module 1422-7 may report information such as a $95^{th}$ percentile determined transaction latency value or other types of statistical information related to determined transaction latency values (e.g., moving average, max/min values, etc.).

FIG. 16 illustrates an example of a second storage medium. As shown in FIG. 16, the second storage medium includes a storage medium 1600. Storage medium 1600 may comprise an article of manufacture. In some examples, storage medium 1600 may include any non-transitory computer readable medium or machine readable medium, such as an optical, magnetic or semiconductor storage. Storage medium 1600 may store various types of computer executable instructions, such as instructions to implement logic flow 1500. Examples of computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 17:
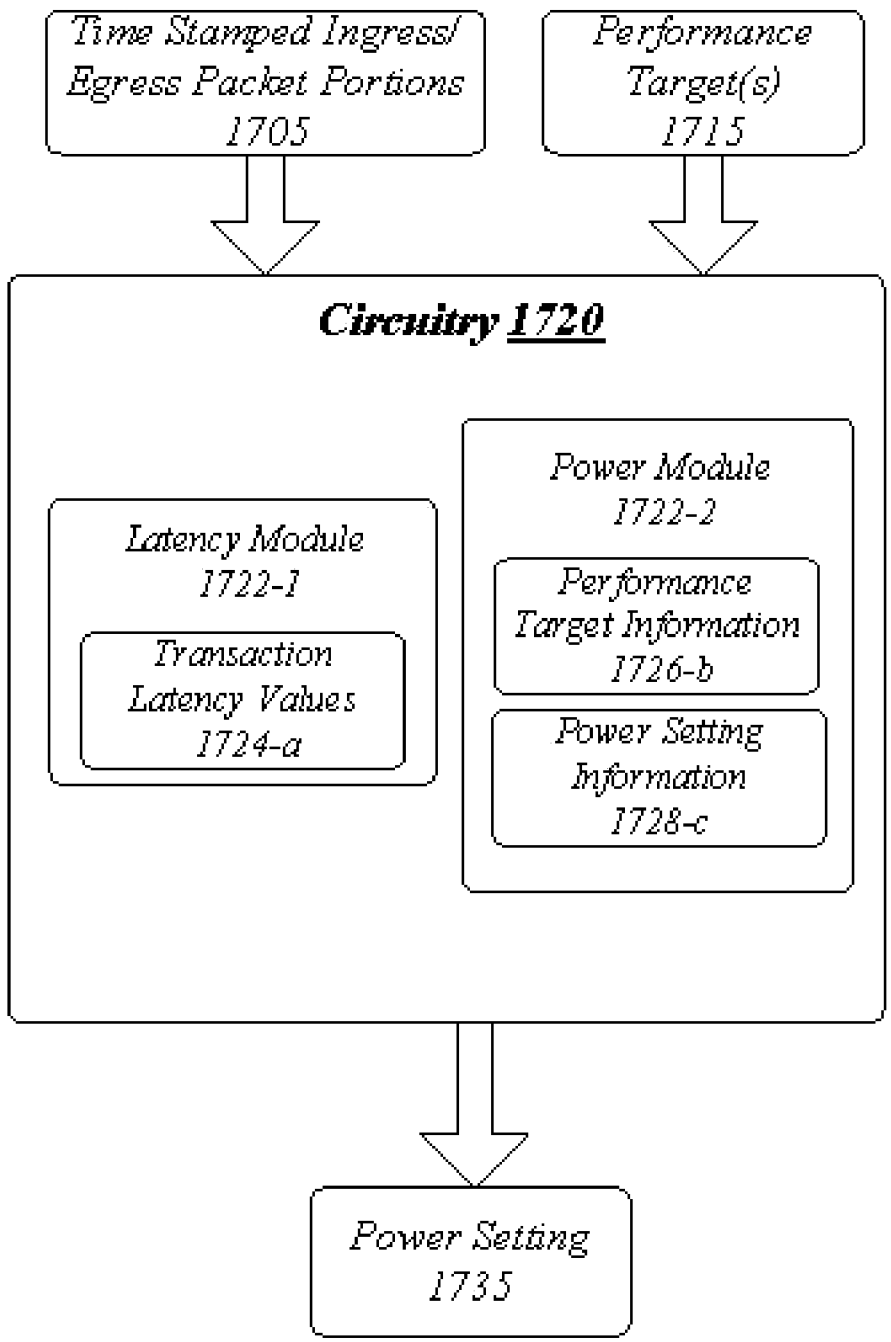
FIG. 17 illustrates an example block diagram for a third apparatus.

FIG. 17 illustrates an example block diagram for a third apparatus. As shown in FIG. 17, the third apparatus includes an apparatus 1700. Although apparatus 1700 shown in FIG. 17 has a limited number of elements in a certain topology or configuration, it may be appreciated that apparatus 1700 may include more or less elements in alternate configurations as desired for a given implementation.

The apparatus 1700 may be supported by circuitry 1720 maintained at a server. Circuitry 1720 may be arranged to execute one or more software or firmware implemented modules 1722-*a*. It is worthy to note that "a" and "b" and "c" and similar designators as used herein are intended to be variables representing any positive integer. Thus, for example, if an implementation sets a value for a=2, then a complete set of software or firmware for modules 1722-*a* may include modules 1722-1 or 1722-2. The examples presented are not limited in this context and the different variables used throughout may represent the same or different integer values.

In some examples, as shown in FIG. 17, apparatus 1700 includes circuitry 1720. Circuitry 1720 may be generally arranged to execute one or more software and/or firmware modules 1722-*a*. Circuitry 1720 may part of server's circuitry that includes processing cores (e.g., used as a CPU). Alternatively circuitry 1720 may part of the circuitry in a chipset for the server. In either scenario, circuitry 1720 may be a part of any of various commercially available processors to include, but not limited to, those previously mentioned for circuitry 1120 for apparatus 1100. Circuitry 1720 may also be part of dual microprocessors, multi-core processors, and other multi-processor architectures. According to some examples, circuitry 1720 may also be an ASIC and modules 1722-*a* may be implemented as hardware elements of the ASIC included as part of the circuitry in the chipset (e.g., a manageability engine or a power node manager).

According to some examples, apparatus 1700 may include a latency module 1722-1. Latency module 1722-1 may be capable of determining transaction latency values based on time stamped portions of ingress request packets matched to time stamped portions of egress response packets that are received from a network I/O device coupled to the server having apparatus 1700. For these examples, time stamped ingress/egress packet portions 1705 may be used by latency module 1722-1 to determine transaction latency values. In some examples, latency module 1722-1 may perform all or some of the functions mentioned above for modules included in apparatus 1400 in order to determine transaction latency values. For example, latency module 1722-1 may receive ingress/egress packet portions 1705, match ingress request portions with egress response portions and determine separate transaction latency values based on the matched portions. In some respects, latency module 1722-1 may serve as a second part of a passive monitor. Meanwhile, circuitry at the network I/O device may serve a first part of the passive monitor.

In some examples, apparatus 1700 may also include a power module 1722-2. Power module 1722-2 may be capable of causing an amount of power provided to the server to be adjusted based on a comparison of transaction latency values determined by latency module 1722-2 to a given transaction latency target. For these examples the give transaction latency target may be based on performance target information 1726-*b* maintained by power module 1722-2 (e.g., in a LUT). According to some examples performance target information 1726-*b* may include information received via performance target(s) 1715. According to some examples, performance target(s) 1715 may be received from management logic capable of managing the server as a part of a data center including a plurality of servers. Performance target(s) 1715 may include, but are not limited to, transaction latency target values or power consumption targets. In some other example, performance target(s) 1715 may incorporate power control policies embedded in a basic input/output system (BIOS) for the server or included in a power management scheme managed by an operating system or a managing element for the server (e.g., a manageability engine). For these other examples, performance target(s) 1715 may be obtained from one or more of the BIOS, the operating system or the managing element.

Power module 1722-2 may also maintain power setting information 1728-*c* (e.g., in a LUT or other data structure). Power setting information 1728-*c* may include policy information associated with power management for the server that may indicate how power module 1722-2 is to cause adjustments to the amount of power provided to the server in order to meet the given transaction latency target. In some examples, power setting information 1728-*c* may also be based on received or obtained performance target(s) 1715.

Various components of apparatus 1700 and a device implementing apparatus 1700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 18 illustrates an example of a third logic flow. As shown in FIG. 18, the third logic flow includes a logic flow 1800. Logic flow 1800 may be representative of some or all of the operations executed by one or more logic, features, or devices described herein, such as apparatus 1700. More particularly, logic flow 1800 may be implemented by latency module 1722-1 or power module 1722-2.

In the illustrated example shown in FIG. 18, logic flow 1800 at block 1802 may determine transaction latency values based on time stamped portions of ingress request packets matched to time stamped portions of egress response packets that are received from a network I/O device coupled to a server that includes apparatus 1700. In some examples, latency module 1722-1 may receive time stamped ingress/egress packet portions 1705 from circuitry at the network I/O device and used the received time stamped ingress/egress packet portions 1705 to determine the transaction latency values.

According to some examples, logic flow 1800 at block 1804 may cause an amount of power provided to the server to be adjusted based on a comparison of transaction latency values determined by the latency module to a given transaction latency target value. Power module 1722-2 may cause adjustments to the amount of power based on performance target information 1726 and/or power setting information 1728-c. In some examples, received performance target(s) 1715 (e.g., from a management logic, BIOS, OS or ME) may influence or set values for transaction latencies or power consumption included in performance target information 1726 and/or power setting information 1728-c.

FIG. 19 illustrates an example of a third storage medium. As shown in FIG. 19, the third storage medium includes a storage medium 1900. Storage medium 1900 may comprise an article of manufacture. In some examples, storage medium 1900 may include any non-transitory computer readable medium or machine readable medium, such as an optical, magnetic or semiconductor storage. Storage medium 1900 may store various types of computer executable instructions, such as instructions to implement logic flow 1800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 20:
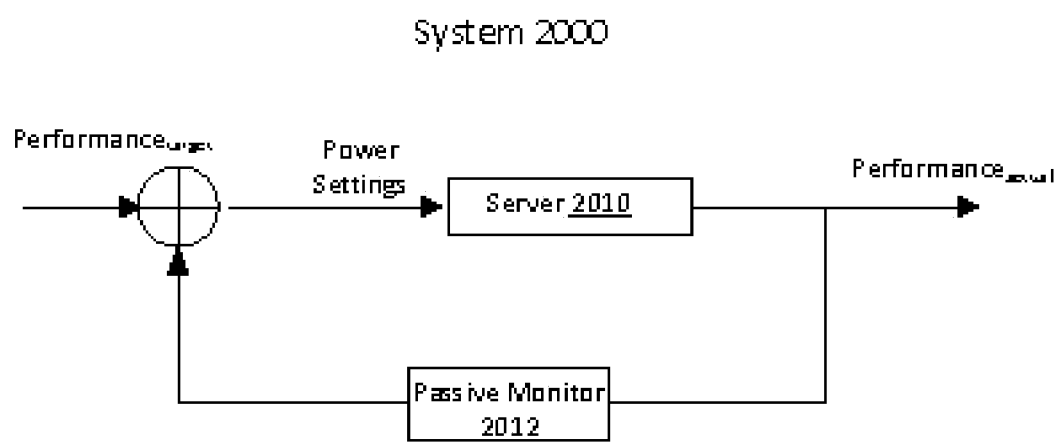
FIG. 20 illustrates a fourth example system.

FIG. 20 illustrates a fourth example system. As shown in FIG. 20, the fourth example system includes system 2000. In some examples, as shown in FIG. 20, system 2000 includes a server 2010 and a passive monitor 2012.

In some examples, passive monitor 2012 may include logic and/or features (e.g., apparatus 1700) capable of receiving a performance$_{target}$ and causing power settings to be made or adjusted for power server 2010. A performance$_{actual}$ may result from the power settings. Passive monitor 2012 may further include logic and/or features at a network I/O device coupled to server 2010 (e.g., apparatus 1100) to time stamp ingress/egress packets, gather portions of the time stamped ingress/egress packets and send the time stamped portions to logic and/or features at server 2010 (e.g., apparatus 1700). The logic and/or features of passive monitor 2012 may then determine transaction latency values based on the received time stamped portions and use the determined transaction latency to decide whether the power setting need to be adjusted in order to meet the performance$_{target}$.

According to some examples, if transaction latency values determined by passive monitor 2012 are above a transaction latency value target associated with the performance$_{target}$, then elements of passive monitor 2012 may cause power settings to be adjusted in a way to increase power to server 2010 to reduce transaction latency values to a level approximately equal to the transaction latency value target. In other examples, if passive monitor 2012 determines transaction latency values are below the transaction latency value target associated with the performance$_{target}$, element of passive monitor 2012 may cause power settings to be adjusted in a way to decrease power to server 2010 to increase transaction latency values. The latter example, may be an effort to balance power consumption with performance for server 2010.

Figure 21:
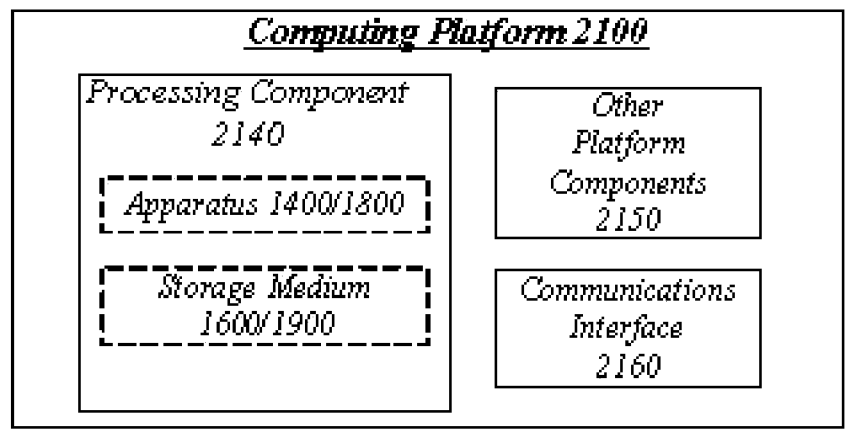
FIG. 21 illustrates an example computing platform.

FIG. 21 illustrates an example computing platform 2100. In some examples, as shown in FIG. 21, computing platform 2100 may include a processing component 2140, other platform components or a communications interface 2160. According to some examples, computing platform 2100 may be implemented in a computing device such as a server in a system or data center as mentioned above.

According to some examples, processing component 2140 may execute processing operations or logic for apparatus 1400/1700 and/or storage medium 1600/1900. Processing component 2140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 2150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 2160 may include logic and/or features to support a communication interface. For these examples, communications interface 2160 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification, the IPMI specification or the MCTP specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 2100 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 2100 described herein, may be included or omitted in various embodiments of computing platform 2100, as suitably desired.

The components and features of computing platform 2100 may be implemented using any combination of discrete circuitry, application specific integrated circuits (ASICs), logic gates and/or single chip architectures. Further, the features of computing platform 2100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 2100 shown in the block diagram of FIG. 21 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 22:
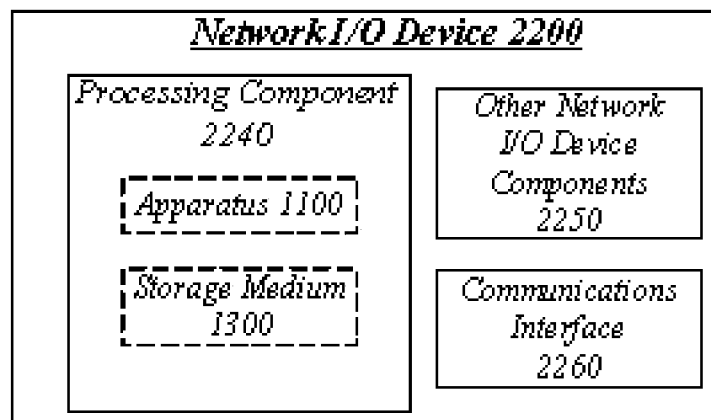
FIG. 22 illustrates an example network input/output device.

FIG. 22 illustrates an example network I/O device 2200. In some examples, as shown in FIG. 22, network I/O device 2200 may include a processing component 2240, other platform components or a communications interface 2260. According to some examples, network I/O device 2200 may be implemented in a network I/O device coupled to a server in a system or data center as mentioned above.

According to some examples, processing component 2240 may execute processing operations or logic for apparatus 1100 and/or storage medium 1300. Processing component 2240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 2250 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 2260 may include logic and/or features to support a communication interface. For these examples, communications interface 2260 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification, the IPMI specification or the MCTP specification. Network communications may occur via use of communication protocols or standards such those described in one or more Ethernet standards such as IEEE 802.3.

The components and features of network I/O device 2200 may be implemented using any combination of discrete circuitry, application specific integrated circuits (ASICs), logic gates and/or single chip architectures. Further, the features of network I/O device 2200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary network I/O device 2200 shown in the block diagram of FIG. 22 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

According to some examples, an example first apparatus may include circuitry for a network I/O device. The example first apparatus may also include a time stamp module to be executed by the circuitry to place separate time stamps on ingress request packets destined for a server coupled to the network input/output device and place separate time stamps on egress response packets sourced from the server. The example first apparatus may also include a capture module to be executed by the circuitry to capture portions of separate ingress request packets and portions of separate egress response packets. The captured portions may identify the separately time stamped ingress request packets and the separately time stamped egress response packets. The example first apparatus may also include a forward module to be executed by the circuitry to forward the captured portions with respective time stamps to the server.

In some examples for the example first apparatus, the forwarded captured portions may be associated with one or more transactions. A given transaction may include a given ingress request packet that causes the server to generate a given egress response packet. The circuitry maintained at the server may be arranged to determine a transaction latency value based on the time stamps placed on the given ingress request and egress response packets.

According to some examples for the example first apparatus, the capture module may capture portions with respective time stamps over a given time interval and the forward module may be arranged to forward the captured portions with respective time stamps at the end of the given time interval.

In some examples for the example first apparatus, the captured portions may be forwarded to circuitry maintained at the server. The circuitry maintained at the server may be included in a chipset. The forward module may forward the captured portions to the circuitry maintained at the server using a transport protocol in compliance with a specification to include Management Component Transport Protocol (MCTP) Host Interface Specification.

According to some examples for the example first apparatus, the captured portions forwarded to circuitry may be maintained at the server. The circuitry maintained at the server may be included in a processor for the server. The circuitry maintained at the server may execute an operating system and a network input/output device driver may be implemented as part of the operating system. The forward module may forward the captured portions to the circuitry maintained at the server using a transport protocol in compliance with a specification to include Management Component Transport Protocol (MCTP) Host Interface Specification.

In some examples for the example first apparatus, the ingress request and the egress response packets may have transmission control protocol (TCP) and Internet protocol (IP) headers. The captured portions may include information from TCP and IP headers for the ingress request and egress response packets. The information may include a source IP address, a destination IP address, a source port or a destination port.

According to some examples, an example second apparatus may include circuitry for a server. The example second apparatus may also include a request module to be executed by the circuitry to receive time stamped portions of ingress request packets and to place the received time stamped portions of the ingress request packets in a transaction table. The example second apparatus may also include a response module to be executed by the circuitry to receive time stamped portions of egress response packets and to place the received time stamped portions of the egress response packets in the transaction table. The example second apparatus may also include a match module to be executed by the circuitry to match time stamped portions of ingress request packets with time stamped portions of egress response packets placed in the transaction table based on information included with respective time stamped portions of the ingress request and the egress response packets. The example second apparatus may also include a latency module to be executed by the circuitry to use first and second time stamps for respective matched time stamped portions of ingress request and egress response packets to determine separate transaction latency values for transactions executed by the server.

In some examples, the example second apparatus may further include a report module to be executed by the circuitry to report information associated with the determined separate transaction latency values to a management logic configured to manage a plurality of servers.

According to some examples for the example second apparatus, the example second apparatus may further include a bucket module to be executed by the circuitry to gather the determined separate transaction latency values in a plurality of buckets. Each bucket may be associated with an incremented time difference and configured to maintain one or more of the separately determined transaction latency values based on a proximity of respective separately determined transaction latency values to a given incremented time difference. Each incremented time difference may be based on a span of time between a lowest determined transaction latency value and a highest determined transaction latency value from among the determined separate transaction latency values gathered over a previous time interval. The second apparatus may also include a sort module to be executed by the circuitry to determine which bucket from among the plurality of buckets includes an $n^{th}$ percentile determined transaction latency value, where n equals any positive integer less than or equal to 100. The sort module may sort the bucket including the $n^{th}$ percentile determined transaction latency value to determine a given transaction latency value that equals the $n^{th}$ percentile determined transaction latency value. The sort module may provide the given transaction latency value to the report module. The report module may include the given transaction latency value in the information reported to the management logic.

In some examples for the example second apparatus, the $n^{th}$ percentile determined transaction latency value may include n equal to 95 and the given transaction latency value may have a value greater than or equal to 95% of separately determined transaction latency values gathered in the plurality of buckets over the current time interval.

According to some examples for the example second apparatus, the plurality of buckets may be maintained in a memory for the server. The memory may include one of dynamic random access memory or static random access memory.

In some examples for the example second apparatus, the circuitry for the server may be maintained at a chipset for the server.

According to some examples for the example second apparatus, the circuitry for the server included in a processor for the server may be arranged to execute an operating system for the server. The match module, the latency module and the report module may be included in a network input/output device driver implemented as part of the operating system.

In some examples for the example second apparatus, the latency module may erase matched time stamped portions of ingress request packets and erase matched time stamped portions of egress request packets from the transaction table following determination of the separate transaction latency values based on the matched time stamped portions of ingress request and egress response packets.

According to some examples for the example second apparatus, the time stamped portions of ingress request and egress response packets received may include transmission control protocol (TCP) and Internet protocol (IP) header information. The TCP and IP header information may include a source IP address, a destination IP address, a source port or a destination port.

In some examples, example first methods may include determining, at management logic for a data center, an average channel transaction latency value for a first network communication channel over a first time period. The first network communication channel may couple a first server to a second server. The average channel transaction latency value may be determined based on a first average transaction latency value for a first set of transactions observed at the first server and a second average transaction latency value for the first set of transactions observed at the second server. The example first methods may also include determining an average server transaction latency value for the first server over the first time period. The average server transaction latency value may be determined based on a third average transaction latency value for incoming requests received at the first server, a fourth average transaction latency value for outgoing requests to one or more servers to include the second server and a total number of the incoming requests received at the first server over the first time period. The example first methods may also include generating a topological graph showing the average channel transaction latency for the first network communication channel and the average server transaction latency value for the first server. The example first methods may also include updating the topological graph following a second time period. The updated topological graph may show an updated average channel transaction latency value for the first network communication channel determined over the second time period and an updated average server transaction latency value for the first server also determined over the second time period.

According to some examples for the example first methods, determining the average channel transaction latency value for the first network communication channel may be based on a difference between the first average transaction latency value and the second average transaction latency value.

In some examples for the example first methods, determining the average server transaction latency value for the first server may be based on a difference between the third average transaction latency value and the fourth average transaction latency value and then dividing the difference by the total number of the incoming requests received at the first server over the first time period.

According to some examples for the example first methods, the first server and the second server may separately include one or more network input/output devices to time stamp both ingress request packets and egress response packets and gather portions of separately time stamped ingress request and egress response packets to enable the first and second servers to identify separate transactions and to determine separate transaction latency values for the identified separate transactions.

In some examples for the example first methods, the ingress request and the egress response packets associated with the identified separate transactions may have transmission control protocol (TCP) and Internet protocol (IP) headers. The gathered portions of the separately time stamped ingress request and egress response packets may include information from TCP and IP headers for the ingress request and egress response packets associated with the identified separate transactions. The information may include a source IP address, a destination IP address, a source port or a destination port.

According to some examples, at least one machine readable medium comprising a plurality of instructions that in response to being executed on a system cause the system to carry out the example first methods as mentioned above.

In some examples, example second methods may include receiving, at management logic for a data center, transaction latency values from a plurality of servers included in the data center responsive to a polling request to the plurality of servers from the management logic. The example second methods may also include comparing the received transaction latency values to target transaction latency values associated with the plurality of servers and services provided by the plurality of servers. The example second methods may also include generating an alert based on a first server from among the plurality of servers providing a first service having a transaction latency value for the first service that exceeds a given target transaction latency value. The example second methods may also includes ending the alert to a management console configured to monitor performance of the plurality of servers. The alert may indicate the given target transaction latency value that was exceeded, may identify the first server or may identify the first service.

According to some examples for the example second methods, the plurality of servers may include at least one network input/output device to time stamp both ingress request packets and egress response packets. The at least one network input/out device may also gather portions of separately time stamped ingress request and egress response packets to enable the plurality of servers to identify separate transactions associated with services provided by the plurality of servers and to also enable the plurality of servers to determine separate transaction latency values for the identified separate transactions associated with respective services.

In some examples for the example second methods, the ingress request and the egress response packets may be associated with the identified separate transactions at the plurality of servers having transmission control protocol (TCP) and Internet protocol (IP) headers. The gathered portions of the separately time stamped ingress request and egress response packets may include information from TCP and IP headers for the ingress request and egress response packets associated with the identified separate transactions associated with respective services. The information may include a source IP address, a destination IP address, a source port or a destination port.

According to some examples for the example second methods, the first server may be identified based on a destination IP address included in gathered portions of separately time stamped egress response packets associated with separate transactions associated with the first service. The first service may be identified based on a destination port included in the gathered portions of the separately time stamped egress response packets.

In some examples for the example second methods, the transaction latency values may be received from the plurality of servers to include at least one of a moving average transaction latency value or a 95$^{th}$ percentile transaction latency value for each server from among the plurality of servers.

According to some examples, at least one machine readable medium comprising a plurality of instructions that in response to being executed on a system cause the system to carry out the example second methods as mentioned above.

In some examples, example third methods may include receiving, at management logic for a data center, transaction latency values from a plurality of physical servers. Each physical server may be capable of supporting one or more virtual servers. The transaction latency values may be received responsive to a polling request from the management logic. The example third methods may also include determining available capacity of each physical server from among the plurality of physical servers to support one or more additional virtual servers based, at least in part, on the received transaction latency values. The example third methods may also include assigning a new virtual server to a first physical server from among the plurality of physical servers based on the first physical server having a highest determined capacity to support one or more additional virtual servers as compared to other physical servers from among the plurality of physical servers.

According to some examples, the example third methods may also include determining that a second physical server from among the plurality of physical servers lacks capacity to support an existing first virtual server based, at least in part, on the received transaction latency values. The example third methods may also include migrating the existing first virtual server to a third physical server from among the plurality of physical servers based on the third physical server having available capacity to support the existing first virtual server.

In some examples for the example third methods, the plurality of physical servers may separately include a network input/output device to time stamp both ingress request packets and egress response packets for supported virtual servers. The network input/output device may also gather portions of separately time stamped ingress request and egress response packets to enable the plurality of physical servers to identify separate transactions associated with supported virtual servers and to also enable the plurality of physical servers to determine separate transaction latency values for the identified separate transactions associated with respective supported virtual servers.

According to some examples for the example third methods, the ingress request and the egress response packets associated with the identified separate transactions may have transmission control protocol (TCP) and Internet protocol (IP) headers. The gathered portions of the separately time stamped ingress request and egress response packets may include information from TCP and IP headers for the ingress request and egress response packets associated with the identified separate transactions. The information may include a source IP address, a destination IP address, a source port or a destination port.

According to some examples, at least one machine readable medium comprising a plurality of instructions that in response to being executed on a system cause the system to carry out the example third methods as mentioned above.

According to some examples, an example third apparatus may include circuitry for a server. The example third apparatus may also include a latency module to be executed by the circuitry to determine transaction latency values based on time stamped portions of ingress request packets matched to time stamped portions of egress response packets that are received from a network input/output device coupled to the server. The example third apparatus may also include a power module to be executed by the circuitry to cause an amount of power provided to the server to be adjusted based on a comparison of transaction latency values determined by the latency module to a given transaction latency target value.

In some examples for the example third apparatus, the circuitry for the server may be maintained at a chipset for the server. The latency module may be included as part of a manageability engine at the chipset. The power module may be included as part of a power node manager at the chipset.

According to some examples for the example third apparatus, the ingress request and the egress response packets may be associated with the time stamped portions of ingress request and egress response packets received from the network input/output device separately having transmission control protocol (TCP) and Internet protocol (IP) headers. The time stamped portions of ingress request and egress response packets may include TCP and IP header information from respective TCP and IP headers for the ingress request and the egress response packets. The TCP and IP header information may include a source IP address, a destination IP address, a source port or a destination port.

In some examples, example fourth methods may include receiving time stamped portions of ingress request packets from a network input/output device coupled to the server and place the received time stamped portions of the ingress request packets in a transaction table. The example fourth methods may also include receiving time stamped portions of egress response packets from the network input/output device and place the received time stamped portions of the egress response packets in the transaction table. The example fourth methods may also include matching time stamped portions of ingress request packets with time stamped portions of egress response packets placed in the transaction table based on information included with respective time stamped portions of the ingress request and the egress response packets. The example fourth methods may also include using first and second time stamps for respective matched time stamped portions of ingress request and egress response packets to determine separate transaction latency values for transactions executed by the server responsive to separate ingress request packets and completed by the server as indicated by separate egress response packets.

According to some examples, the example fourth methods may also include gathering the determined separate transaction latency values in a plurality of buckets. Each bucket may be associated with an incremented time difference and configured to maintain one or more of the separately determined transaction latency values based on a proximity of respective separately determined transaction latency values to a given incremented time difference. Each incremented time difference may be based on a span of time between a lowest determined transaction latency value and a highest determined transaction latency value from among the determined separate transaction latency values gathered over a previous interval. The example fourth methods may also include determining which bucket from among the plurality of buckets includes an $n^{th}$ percentile determined transaction latency value, where n equals any positive integer less than 100. The example fourth methods may also include sorting the bucket including the $n^{th}$ percentile determined transaction latency value to determine a given transaction latency value that equals the $n^{th}$ percentile determined transaction latency value.

In some examples for the example fourth methods, the time stamped portions of ingress request and egress response packets received from the network input/output device may include transmission control protocol (TCP) and Internet protocol (IP) header information. The TCP and IP header information may include a source IP address, a destination IP address, a source port or a destination port.

According to some examples, at least one machine readable medium comprising a plurality of instructions that in response to being executed on a system cause the system to carry out the example fourth methods as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    circuitry for a network input/output device;
    a time stamp module executed by the circuitry to place separate time stamps on ingress request packets destined for a server coupled to the network input/output device and place separate time stamps on egress response packets sourced from the server;
    a capture module executed by the circuitry to capture portions of separate ingress request packets and portions of separate egress response packets, the captured portions to identify the separately time stamped ingress request packets and the separately time stamped egress response packets; and
    a forward module executed by the circuitry to forward the captured portions with respective time stamps to circuitry maintained at the server using a transport protocol in compliance with a specification to include Management Component Transport Protocol (MCTP) Host Interface Specification, the circuitry maintained at the server included in a chipset;
    the chipset a processor for the server, the processor to execute an operating system and a network input/output device driver implemented as part of the operating system, the forward module to forward the captured portion to the circuitry maintained at the server.

2. The apparatus of claim 1, comprising the forwarded captured portions associated with one or more transactions, a given transaction to include a given ingress request packet that causes the server to generate a given egress response packet, the circuitry maintained at the server arranged to determine a transaction latency value based on the time stamps placed on the given ingress request and egress response packets.

3. The apparatus of claim 1, comprising the capture module to capture portions with respective time stamps over a given time interval and the forward module arranged to forward the captured portions with respective time stamps at an end of the given time interval.

4. The apparatus of claim 1, the captured portions with respective time stamps forwarded to the server comprises the captured portions forwarded to circuitry maintained at the server, the circuitry maintained at the server included in a chipset, the forward module to forward the captured portions to the circuitry maintained at the server.

5. The apparatus of claim 1, comprising the ingress request and the egress response packets having transmission control protocol (TCP) and Internet protocol (IP) headers, the captured portions to include information from TCP and IP headers for the ingress request and egress response packets, the information to include a source IP address, a destination IP address, a source port or a destination port.

6. An apparatus, comprising:
    circuitry for a server;
    a request module executed by the circuitry to receive time stamped portions of ingress request packets and to place the received time stamped portions of the ingress request packets in a transaction table;
    a response module executed by the circuitry to receive time stamped portions of egress response packets and to place the received time stamped portions of the egress response packets in the transaction table;
    a match module executed by the circuitry to match time stamped portions of ingress request packets with time stamped portions of egress response packets placed in the transaction table based on information included with respective time stamped portions of the ingress request and the egress response packets, the time stamped portions of the ingress request packets and the egress response packets to include transmission control protocol (TCP) and Internet protocol (IP) header information, the TCP and IP header information to include a source IP address, a destination IP address, a source port or a destination port;
    a latency module executed by the circuitry to use first and second time stamps for respective matched time stamped portions of ingress request and egress response packets to determine separate transaction latency values for transactions executed by the server; and
    a power module executed by the circuitry to cause an amount of power provided to the server to be adjusted based on a comparison of transaction latency values determined by the latency module to a given transaction latency target value.

7. The apparatus of claim 6, comprising:
    a report module executed by the circuitry to report information associated with the determined separate transaction latency values to a management logic configured to manage a plurality of servers.

8. The apparatus of claim 7, comprising:
    a bucket module executed by the circuitry to gather the determined separate transaction latency values in a plurality of buckets, where each bucket associated with an incremented time difference and configured to maintain one or more of the separately determined transaction latency values based on a proximity of respective separately determined transaction latency values to a given incremented time difference, each incremented time difference based on a span of time between a lowest determined transaction latency value and a highest determined transaction latency value from among the determined separate transaction latency values gathered over a previous time interval; and
    a sort module executed by the circuitry to determine which bucket from among the plurality of buckets includes an $n^{th}$ percentile determined transaction latency value, where n equals any positive integer less than or equal to 100, the sort module to sort the bucket including the $n^{th}$ percentile determined transaction latency value to determine a given transaction latency value that equals the $n^{th}$ percentile determined transaction latency value, the sort module to provide the given transaction latency value to the report module, the report module to include the given transaction latency value in the information reported to the management logic.

9. The apparatus of claim 8, the $n^{th}$ percentile determined transaction latency value comprises n equal to 95 and the given transaction latency value has a value greater than or equal to 95% of separately determined transaction latency values gathered in the plurality of buckets over a current time interval.

10. The apparatus of claim 8, comprising the plurality of buckets maintained in a memory for the server, the memory to include one of dynamic random access memory or static random access memory.

11. The apparatus of claim 6, comprising the circuitry for the server maintained at a chipset for the server.

12. The apparatus of claim 7, comprising the circuitry for the server included in a processor for the server arranged to execute an operating system for the server, the match module, the latency module and the report module included in a network input/output device driver implemented as part of the operating system.

13. The apparatus of claim 6, comprising the latency module to erase matched time stamped portions of ingress request packets and erase matched time stamped portions of egress request packets from the transaction table following determination of the separate transaction latency values based on the matched time stamped portions of ingress request and egress response packets.

14. The apparatus of claim 6, comprising the circuitry for the server maintained at a chipset for the server, the latency module included as part of a manageability engine at the chipset, the power module included as part of a power node manager at the chipset.

15. At least one non-transitory machine readable medium comprising a plurality of instructions that in response to being executed on a server cause the server to:
receive time stamped portions of ingress request packets from a network input/output device coupled to the server and place the received time stamped portions of the ingress request packets in a transaction table;
receive time stamped portions of egress response packets from the network input/output device and place the received time stamped portions of the egress response packets in the transaction table;
match time stamped portions of ingress request packets with time stamped portions of egress response packets placed in the transaction table based on information included with respective time stamped portions of the ingress request and the egress response packets, the time stamped portions of the ingress request packets and the egress response packets to include transmission control protocol (TCP) and Internet protocol (IP) header information, the TCP and IP header information to include a source IP address, a destination IP address, a source port or a destination port;
use first and second time stamps for respective matched time stamped portions of ingress request and egress response packets to determine separate transaction latency values for transactions executed by the server responsive to separate ingress request packets and completed by the server as indicated by separate egress response packets;
gather the determined separate transaction latency values in a plurality of buckets, each bucket associated with an incremented time difference and configured to maintain one or more of the separately determined transaction latency values based on a proximity of respective separately determined transaction latency values to a given incremented time difference; and
sort the buckets to determine a given transaction latency value.

16. The at least one non-transitory machine readable medium of claim 15,
wherein each incremented time difference based on a span of time between a lowest determined transaction latency value and a highest determined transaction latency value from among the determined separate transaction latency values gathered over a previous interval;
determine which bucket from among the plurality of buckets includes an $n^{th}$ percentile determined transaction latency value, where n equals any positive integer less than 100;
sort the buckets including the $n^{th}$ percentile determined transaction latency value to determine the given transaction latency values that equals the $n^{th}$ percentile determined transaction latency value.

* * * * *